(12) United States Patent
Luong

(10) Patent No.: US 9,204,193 B2
(45) Date of Patent: Dec. 1, 2015

(54) SYSTEMS AND METHODS FOR MEDIA DETECTION AND FILTERING USING A PARENTAL CONTROL LOGGING APPLICATION

(75) Inventor: Shiang Luong, Alhambra, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 341 days.

(21) Appl. No.: 12/780,656

(22) Filed: May 14, 2010

(65) Prior Publication Data

US 2011/0283311 A1  Nov. 17, 2011

(51) Int. Cl.
| | |
|---|---|
| H04N 7/16 | (2011.01) |
| H04N 21/475 | (2011.01) |
| H04N 21/414 | (2011.01) |
| H04N 21/436 | (2011.01) |
| H04N 21/442 | (2011.01) |
| H04N 21/45 | (2011.01) |
| H04N 21/454 | (2011.01) |
| H04N 21/482 | (2011.01) |

(52) U.S. Cl.
CPC ......... *H04N 21/4755* (2013.01); *H04N 21/414* (2013.01); *H04N 21/43615* (2013.01); *H04N 21/44213* (2013.01); *H04N 21/4532* (2013.01); *H04N 21/4542* (2013.01); *H04N 21/4751* (2013.01); *H04N 21/4821* (2013.01)

(58) Field of Classification Search
CPC ................................................ H04N 21/2396
USPC .................................................. 725/9–21, 25
See application file for complete search history.

(56) References Cited

U.S. PATENT DOCUMENTS

| | | | |
|---|---|---|---|
| 4,264,924 | A | 4/1981 | Freeman |
| 4,264,925 | A | 4/1981 | Freeman et al. |
| 4,355,415 | A | 10/1982 | George et al. |
| 4,422,105 | A | 12/1983 | Rodesch et al. |
| 4,429,385 | A | 1/1984 | Cichelli et al. |

(Continued)

FOREIGN PATENT DOCUMENTS

| | | |
|---|---|---|
| CA | 2 232 003 | 4/1997 |
| DE | 31 51 492 | 7/1983 |

(Continued)

OTHER PUBLICATIONS

"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.

(Continued)

*Primary Examiner* — Olugbenga Idowu
(74) *Attorney, Agent, or Firm* — Ropes & Gray LLP

(57) ABSTRACT

Systems and methods for accessing parental control features are provided in accordance with various embodiments. Log entries associated with a set of media assets are retrieved from a log data store. Each log entry defines an attempt to access a media asset and includes information identifying the media asset. The log entries may be presented on a display screen and a user selection of a log entry may be received. In response to the user selection, parental control settings assigned to the media asset associated with the selected log entry may be determined. A user may be allowed to modify the parental control settings assigned to the media asset associated with the selected log entry, and the modified parental control settings may be stored in a parental control data store.

24 Claims, 12 Drawing Sheets

(56) References Cited

U.S. PATENT DOCUMENTS

| | | |
|---|---|---|
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,630,108 A | 12/1986 | Gomersall |
| 4,694,490 A | 9/1987 | Harvey et al. |
| 4,706,121 A | 11/1987 | Young |
| 4,718,107 A | 1/1988 | Hayes |
| 4,751,578 A | 6/1988 | Reiter et al. |
| 4,761,684 A | 8/1988 | Clark et al. |
| 4,787,063 A | 11/1988 | Muguet et al. |
| 4,841,562 A | 6/1989 | Lem |
| 4,847,698 A | 7/1989 | Freeman |
| 4,847,700 A | 7/1989 | Freeman |
| 4,857,999 A | 8/1989 | Welsh |
| 4,866,434 A | 9/1989 | Keenan |
| 4,899,370 A | 2/1990 | Kameo et al. |
| 4,908,707 A | 3/1990 | Kinghorn |
| 4,930,158 A | 5/1990 | Vogel |
| 4,945,563 A | 7/1990 | Horton et al. |
| 4,959,720 A | 9/1990 | Duffield et al. |
| 4,965,825 A | 10/1990 | Harvey et al. |
| 4,977,455 A | 12/1990 | Young |
| 4,994,908 A | 2/1991 | Kuban et al. |
| 5,001,554 A | 3/1991 | Johnson et al. |
| 5,016,273 A | 5/1991 | Hoff |
| 5,036,314 A | 7/1991 | Barillari et al. |
| 5,038,211 A | 8/1991 | Hallenbeck |
| 5,047,867 A | 9/1991 | Strubbe et al. |
| 5,068,733 A | 11/1991 | Bennett |
| 5,089,885 A | 2/1992 | Clark |
| 5,105,184 A | 4/1992 | Pirani et al. |
| 5,109,279 A | 4/1992 | Ando |
| 5,113,259 A | 5/1992 | Romesburg et al. |
| 5,132,992 A | 7/1992 | Yurt et al. |
| 5,134,649 A | 7/1992 | Gutzmer |
| 5,134,719 A | 7/1992 | Mankovitz |
| 5,151,789 A | 9/1992 | Young |
| 5,155,591 A | 10/1992 | Wachob |
| 5,168,353 A | 12/1992 | Walker et al. |
| 5,172,413 A | 12/1992 | Bradley et al. |
| 5,179,439 A | 1/1993 | Hashimoto |
| 5,187,589 A | 2/1993 | Kono et al. |
| 5,195,134 A | 3/1993 | Inoue et al. |
| 5,200,822 A | 4/1993 | Bronfin et al. |
| 5,202,915 A | 4/1993 | Nishii |
| 5,210,611 A | 5/1993 | Yee et al. |
| 5,216,228 A | 6/1993 | Hashimoto |
| 5,223,924 A | 6/1993 | Strubbe |
| 5,228,077 A | 7/1993 | Darbee |
| 5,233,423 A | 8/1993 | Jernigan et al. |
| 5,239,654 A | 8/1993 | Ing-Simmons et al. |
| 5,241,428 A | 8/1993 | Goldwasser et al. |
| 5,249,043 A | 9/1993 | Grandmougin |
| 5,253,066 A | 10/1993 | Vogel |
| 5,253,275 A | 10/1993 | Yurt et al. |
| 5,285,284 A | 2/1994 | Takashima et al. |
| 5,296,931 A | 3/1994 | Na et al. |
| 5,307,173 A | 4/1994 | Yuen et al. |
| 5,319,445 A | 6/1994 | Fitts |
| 5,323,234 A | 6/1994 | Kawasaki et al. |
| 5,325,183 A | 6/1994 | Rhee et al. |
| 5,335,079 A | 8/1994 | Yuen et al. |
| 5,335,277 A | 8/1994 | Harvey et al. |
| 5,353,121 A | 10/1994 | Young et al. |
| 5,359,367 A | 10/1994 | Stockill et al. |
| 5,371,551 A | 12/1994 | Logan et al. |
| 5,377,317 A | 12/1994 | Bates et al. |
| 5,382,983 A | 1/1995 | Kwoh et al. |
| 5,398,074 A | 3/1995 | Duffield et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,416,508 A | 5/1995 | Sakuma et al. |
| 5,440,678 A | 8/1995 | Eisen et al. |
| 5,442,389 A | 8/1995 | Blahut et al. |
| 5,455,570 A | 10/1995 | Cook et al. |
| 5,459,522 A | 10/1995 | Pint |
| 5,465,113 A | 11/1995 | Gilboy |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,502,504 A | 3/1996 | Marshall et al. |
| 5,517,257 A | 5/1996 | Dunn et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,541,662 A | 7/1996 | Adams et al. |
| 5,543,856 A | 8/1996 | Rosser et al. |
| 5,550,576 A | 8/1996 | Klosterman |
| 5,550,863 A | 8/1996 | Yurt et al. |
| 5,553,123 A | 9/1996 | Chan et al. |
| 5,557,338 A | 9/1996 | Maze et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,568,272 A | 10/1996 | Levine |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,482 A | 1/1997 | Abraham |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,602,582 A | 2/1997 | Wanderscheid et al. |
| 5,606,374 A | 2/1997 | Bertram |
| 5,610,653 A | 3/1997 | Abecassis |
| 5,617,526 A | 4/1997 | Oran et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,406 A | 4/1997 | Newberry et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,648,824 A | 7/1997 | Dunn et al. |
| 5,650,826 A | 7/1997 | Eitz et al. |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |

(56) References Cited

U.S. PATENT DOCUMENTS

| | | |
|---|---|---|
| 5,655,214 A | 8/1997 | Mullett et al. |
| 5,657,072 A | 8/1997 | Aristides et al. |
| 5,657,414 A | 8/1997 | Lett et al. |
| 5,659,350 A | 8/1997 | Hendricks et al. |
| 5,659,367 A | 8/1997 | Yuen |
| 5,661,516 A | 8/1997 | Carles |
| 5,666,293 A | 9/1997 | Metz et al. |
| 5,666,498 A | 9/1997 | Amro |
| 5,666,645 A | 9/1997 | Thomas et al. |
| 5,675,390 A | 10/1997 | Schindler et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,689,666 A | 11/1997 | Berquist et al. |
| 5,692,214 A | 11/1997 | Levine |
| 5,694,163 A | 12/1997 | Harrison |
| 5,694,381 A | 12/1997 | Sako et al. |
| 5,696,824 A | 12/1997 | Walsh |
| 5,699,107 A | 12/1997 | Lawler et al. |
| 5,710,601 A | 1/1998 | Marshall et al. |
| 5,710,605 A | 1/1998 | Nelson |
| 5,710,884 A | 1/1998 | Dedrick |
| 5,715,020 A | 2/1998 | Kuroiwa et al. |
| 5,717,452 A | 2/1998 | Janin et al. |
| 5,724,091 A | 3/1998 | Freeman et al. |
| 5,727,060 A | 3/1998 | Young |
| 5,734,720 A | 3/1998 | Salganicoff |
| 5,734,853 A | 3/1998 | Hendricks et al. |
| 5,734,893 A | 3/1998 | Li et al. |
| 5,742,905 A | 4/1998 | Pepe et al. |
| 5,745,710 A | 4/1998 | Clanton, III et al. |
| 5,748,191 A | 5/1998 | Rozak et al. |
| 5,748,716 A | 5/1998 | Levine |
| 5,748,732 A | 5/1998 | Le Berre et al. |
| 5,751,282 A | 5/1998 | Girard et al. |
| 5,752,159 A | 5/1998 | Faust et al. |
| 5,754,771 A | 5/1998 | Epperson et al. |
| 5,754,938 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,768,528 A | 6/1998 | Stumm |
| 5,771,275 A | 6/1998 | Brunner et al. |
| 5,774,664 A | 6/1998 | Hidary et al. |
| 5,774,666 A | 6/1998 | Portuesi |
| 5,774,859 A | 6/1998 | Houser et al. |
| 5,778,182 A | 7/1998 | Cathey et al. |
| 5,781,226 A | 7/1998 | Sheehan |
| 5,781,246 A | 7/1998 | Alten et al. |
| 5,787,259 A | 7/1998 | Haroun et al. |
| 5,788,507 A | 8/1998 | Redford et al. |
| 5,790,198 A | 8/1998 | Roop et al. |
| 5,790,202 A | 8/1998 | Kummer et al. |
| 5,793,964 A | 8/1998 | Rogers et al. |
| 5,796,952 A | 8/1998 | Davis et al. |
| 5,798,785 A | 8/1998 | Hendricks et al. |
| 5,801,787 A | 9/1998 | Schein et al. |
| 5,802,284 A | 9/1998 | Karlton et al. |
| 5,805,155 A | 9/1998 | Allibhoy et al. |
| 5,805,204 A | 9/1998 | Thompson et al. |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,812,123 A | 9/1998 | Rowe et al. |
| 5,812,205 A | 9/1998 | Milnes et al. |
| 5,812,930 A | 9/1998 | Zavrel |
| 5,812,931 A | 9/1998 | Yuen |
| 5,812,937 A | 9/1998 | Takahisa et al. |
| 5,818,438 A | 10/1998 | Howe et al. |
| 5,818,441 A | 10/1998 | Throckmorton et al. |
| 5,819,019 A | 10/1998 | Nelson |
| 5,819,156 A | 10/1998 | Belmont |
| 5,822,123 A | 10/1998 | Davis et al. |
| 5,822,606 A | 10/1998 | Morton |
| 5,828,420 A | 10/1998 | Marshall et al. |
| 5,828,945 A | 10/1998 | Klosterman |
| RE35,954 E | 11/1998 | Levine |
| 5,838,314 A | 11/1998 | Neel et al. |
| 5,844,620 A | 12/1998 | Coleman et al. |
| 5,846,704 A | 12/1998 | Maertens et al. |
| 5,850,218 A | 12/1998 | LaJoie et al. |
| 5,852,437 A | 12/1998 | Wugofski et al. |
| 5,861,881 A | 1/1999 | Freeman et al. |
| 5,864,704 A | 1/1999 | Battle et al. |
| 5,867,223 A | 2/1999 | Schindler et al. |
| 5,867,233 A | 2/1999 | Tanaka et al. |
| 5,867,799 A | 2/1999 | Lang et al. |
| 5,878,222 A | 3/1999 | Harrison |
| 5,880,768 A | 3/1999 | Lemmons et al. |
| 5,883,621 A | 3/1999 | Iwamura |
| 5,884,298 A | 3/1999 | Smith, II et al. |
| 5,886,732 A | 3/1999 | Humpleman |
| 5,901,366 A | 5/1999 | Nakano et al. |
| 5,907,323 A | 5/1999 | Lawler et al. |
| 5,914,746 A | 6/1999 | Matthews, III et al. |
| 5,915,068 A | 6/1999 | Levine |
| 5,917,405 A | 6/1999 | Joao |
| 5,926,624 A | 7/1999 | Katz et al. |
| 5,929,849 A | 7/1999 | Kikinis |
| 5,940,572 A | 8/1999 | Balaban et al. |
| 5,945,988 A | 8/1999 | Williams et al. |
| 5,956,025 A | 9/1999 | Goulden et al. |
| 5,959,592 A | 9/1999 | Petruzzelli |
| 5,963,264 A | 10/1999 | Jackson |
| 5,963,645 A | 10/1999 | Kigawa et al. |
| 5,969,748 A | 10/1999 | Casement et al. |
| 5,970,473 A | 10/1999 | Gerszberg et al. |
| 5,973,683 A | 10/1999 | Cragun et al. |
| 5,977,964 A | 11/1999 | Williams et al. |
| 5,982,411 A | 11/1999 | Eyer et al. |
| 5,987,509 A | 11/1999 | Portuesi |
| 5,988,078 A | 11/1999 | Levine |
| 5,990,885 A | 11/1999 | Gopinath |
| 5,991,799 A | 11/1999 | Yen et al. |
| 5,991,832 A | 11/1999 | Sato et al. |
| 6,002,394 A | 12/1999 | Schein et al. |
| 6,002,450 A | 12/1999 | Darbee et al. |
| 6,005,561 A | 12/1999 | Hawkins et al. |
| 6,005,565 A | 12/1999 | Legall et al. |
| 6,005,631 A | 12/1999 | Anderson et al. |
| 6,006,257 A | 12/1999 | Slezak |
| 6,009,153 A | 12/1999 | Houghton et al. |
| 6,009,465 A | 12/1999 | Decker et al. |
| 6,012,086 A | 1/2000 | Lowell |
| 6,020,880 A | 2/2000 | Naimpally |
| 6,020,883 A | 2/2000 | Herz et al. |
| 6,025,837 A | 2/2000 | Matthews, III et al. |
| 6,025,869 A | 2/2000 | Stas et al. |
| 6,035,339 A | 3/2000 | Agraharam et al. |
| 6,038,367 A | 3/2000 | Abecassis |
| 6,040,829 A | 3/2000 | Croy et al. |
| 6,049,823 A | 4/2000 | Hwang |
| 6,057,872 A | 5/2000 | Candelore |
| 6,057,890 A | 5/2000 | Virden et al. |
| 6,058,238 A | 5/2000 | Ng |
| 6,061,779 A | 5/2000 | Garde |
| 6,064,980 A | 5/2000 | Jacobi et al. |
| 6,067,564 A | 5/2000 | Urakoshi et al. |
| 6,075,568 A | 6/2000 | Matsuura |
| 6,091,884 A | 7/2000 | Yuen et al. |
| 6,097,441 A | 8/2000 | Allport |
| 6,104,334 A | 8/2000 | Allport |
| 6,115,057 A | 9/2000 | Kwoh et al. |
| 6,130,726 A | 10/2000 | Darbee et al. |
| 6,133,910 A | 10/2000 | Stinebruner |
| 6,133,912 A | 10/2000 | Montero |
| 6,141,488 A | 10/2000 | Knudson et al. |
| 6,144,401 A | 11/2000 | Casement et al. |
| 6,144,702 A | 11/2000 | Yurt et al. |
| 6,157,411 A | 12/2000 | Williams et al. |
| 6,157,413 A | 12/2000 | Hanafee et al. |

(56) References Cited

U.S. PATENT DOCUMENTS

| | | |
|---|---|---|
| 6,160,988 A | 12/2000 | Shroyer |
| 6,163,272 A | 12/2000 | Goode et al. |
| 6,163,316 A | 12/2000 | Killian |
| 6,166,778 A | 12/2000 | Yamamoto et al. |
| 6,167,188 A | 12/2000 | Young et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander et al. |
| 6,182,094 B1 | 1/2001 | Humpleman et al. |
| 6,188,381 B1 | 2/2001 | van der Wal et al. |
| 6,188,397 B1 | 2/2001 | Humpleman |
| 6,192,340 B1 | 2/2001 | Abecassis |
| 6,202,211 B1 | 3/2001 | Williams, Jr. |
| 6,208,335 B1 | 3/2001 | Gordon et al. |
| 6,208,384 B1 | 3/2001 | Schultheiss |
| 6,208,799 B1 | 3/2001 | Marsh et al. |
| 6,219,839 B1 | 4/2001 | Sampsell |
| 6,233,389 B1 | 5/2001 | Barton et al. |
| 6,233,734 B1 | 5/2001 | Macrae et al. |
| 6,237,049 B1 | 5/2001 | Ludtke |
| 6,239,794 B1 | 5/2001 | Yuen et al. |
| 6,240,555 B1 | 5/2001 | Shoff et al. |
| 6,260,088 B1 | 7/2001 | Gove et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,648 B1 | 8/2001 | Knudson et al. |
| 6,286,142 B1 | 9/2001 | Ehreth |
| 6,288,716 B1 | 9/2001 | Humpleman et al. |
| 6,292,624 B1 | 9/2001 | Saib et al. |
| 6,298,482 B1 | 10/2001 | Seidman et al. |
| 6,305,018 B1 | 10/2001 | Usui et al. |
| 6,310,886 B1 | 10/2001 | Barton |
| 6,311,011 B1 | 10/2001 | Kuroda et al. |
| 6,317,884 B1 | 11/2001 | Eames et al. |
| 6,321,318 B1 | 11/2001 | Baltz et al. |
| 6,324,338 B1 | 11/2001 | Wood et al. |
| 6,326,982 B1 | 12/2001 | Wu et al. |
| 6,327,418 B1 | 12/2001 | Barton |
| 6,331,877 B1 | 12/2001 | Bennington et al. |
| 6,336,099 B1 | 1/2002 | Barnett et al. |
| 6,357,043 B1 | 3/2002 | Ellis et al. |
| 6,367,080 B1 | 4/2002 | Enomoto et al. |
| 6,374,406 B2 | 4/2002 | Hirata |
| 6,388,714 B1 | 5/2002 | Schein et al. |
| 6,396,544 B1 | 5/2002 | Schindler et al. |
| 6,397,080 B1 | 5/2002 | Viktorsson et al. |
| 6,437,836 B1 | 8/2002 | Huang et al. |
| 6,442,332 B1 | 8/2002 | Knudson et al. |
| 6,445,398 B1 | 9/2002 | Gerba et al. |
| 6,463,585 B1 | 10/2002 | Hendricks et al. |
| 6,473,559 B1 | 10/2002 | Knudson et al. |
| 6,486,892 B1 | 11/2002 | Stern |
| 6,493,875 B1 | 12/2002 | Eames et al. |
| 6,505,348 B1 | 1/2003 | Knowles et al. |
| 6,509,908 B1 | 1/2003 | Croy et al. |
| 6,530,083 B1 | 3/2003 | Liebenow |
| 6,545,722 B1 | 4/2003 | Schultheiss et al. |
| 6,557,031 B1 | 4/2003 | Mimura et al. |
| 6,564,383 B1 | 5/2003 | Combs et al. |
| 6,571,279 B1 | 5/2003 | Herz et al. |
| 6,603,488 B2 | 8/2003 | Humpleman et al. |
| 6,611,654 B1 | 8/2003 | Shteyn |
| 6,622,304 B1 | 9/2003 | Carhart |
| 6,670,971 B1 | 12/2003 | Oral |
| 6,675,385 B1 | 1/2004 | Wang |
| 6,684,240 B1 * | 1/2004 | Goddard ............... 709/217 |
| 6,701,523 B1 | 3/2004 | Hancock et al. |
| 6,704,028 B2 | 3/2004 | Wugofski |
| 6,721,954 B1 | 4/2004 | Nickum |
| 6,727,914 B1 | 4/2004 | Gutta |
| 6,732,372 B2 | 5/2004 | Tomita et al. |
| 6,738,978 B1 | 5/2004 | Hendricks et al. |
| 6,744,967 B2 | 6/2004 | Kaminski et al. |
| 6,760,537 B2 | 7/2004 | Mankovitz |
| 6,772,433 B1 | 8/2004 | LaJoie et al. |
| 6,788,882 B1 | 9/2004 | Geer et al. |
| 6,822,661 B2 | 11/2004 | Sai et al. |
| 6,847,686 B2 | 1/2005 | Morad et al. |
| 6,871,146 B1 | 3/2005 | Kelly et al. |
| 6,871,186 B1 | 3/2005 | Tuzhilin et al. |
| 6,922,843 B1 | 7/2005 | Herrington et al. |
| 6,925,567 B1 | 8/2005 | Hirata et al. |
| 6,927,806 B2 | 8/2005 | Chan |
| 6,934,964 B1 | 8/2005 | Schaffer et al. |
| 6,973,669 B2 | 12/2005 | Daniels |
| 7,006,881 B1 | 2/2006 | Hoffberg et al. |
| 7,013,339 B2 | 3/2006 | Schwager et al. |
| 7,017,171 B1 | 3/2006 | Horlander et al. |
| 7,051,353 B2 | 5/2006 | Yamashita et al. |
| 7,084,780 B2 | 8/2006 | Nguyen et al. |
| 7,096,486 B1 | 8/2006 | Ukai et al. |
| 7,117,518 B1 | 10/2006 | Takahashi et al. |
| 7,134,131 B1 | 11/2006 | Hendricks et al. |
| 7,152,236 B1 | 12/2006 | Wugofski et al. |
| 7,194,755 B1 | 3/2007 | Nakata et al. |
| 7,224,886 B2 | 5/2007 | Akamatsu et al. |
| 7,328,450 B2 | 2/2008 | Macrae et al. |
| 7,330,783 B2 | 2/2008 | Tsubota |
| 7,343,616 B1 | 3/2008 | Takahashi et al. |
| 7,421,724 B2 | 9/2008 | Klosterman et al. |
| 7,480,929 B2 | 1/2009 | Klosterman et al. |
| 7,693,831 B2 * | 4/2010 | Fanfant et al. ............ 707/769 |
| 2001/0026533 A1 | 10/2001 | Schwager |
| 2002/0013941 A1 | 1/2002 | Ward, III et al. |
| 2002/0032907 A1 | 3/2002 | Daniels |
| 2002/0040475 A1 | 4/2002 | Yap et al. |
| 2002/0057892 A1 | 5/2002 | Mano et al. |
| 2002/0059599 A1 | 5/2002 | Schein et al. |
| 2002/0059610 A1 | 5/2002 | Ellis |
| 2002/0090203 A1 | 7/2002 | Mankovitz |
| 2002/0095673 A1 | 7/2002 | Leung et al. |
| 2002/0100044 A1 | 7/2002 | Daniels |
| 2002/0100052 A1 | 7/2002 | Daniels |
| 2002/0118676 A1 | 8/2002 | Tonnby et al. |
| 2002/0124252 A1 * | 9/2002 | Schaefer et al. ............ 725/33 |
| 2002/0129368 A1 | 9/2002 | Schlack et al. |
| 2002/0174424 A1 | 11/2002 | Chang et al. |
| 2002/0184626 A1 | 12/2002 | Darbee et al. |
| 2002/0194596 A1 | 12/2002 | Srivastava |
| 2003/0005445 A1 | 1/2003 | Schein et al. |
| 2003/0012555 A1 | 1/2003 | Yuen |
| 2003/0031465 A1 | 2/2003 | Blake |
| 2003/0037336 A1 | 2/2003 | Leftwich |
| 2003/0040962 A1 | 2/2003 | Lewis |
| 2003/0079227 A1 | 4/2003 | Knowles et al. |
| 2003/0084461 A1 | 5/2003 | Hoang |
| 2003/0093329 A1 | 5/2003 | Gutta |
| 2003/0131356 A1 | 7/2003 | Proehl et al. |
| 2003/0159157 A1 | 8/2003 | Chan |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0198462 A1 | 10/2003 | Bumgardner et al. |
| 2003/0208756 A1 | 11/2003 | Macrae et al. |
| 2003/0229900 A1 | 12/2003 | Reisman |
| 2004/0010798 A1 | 1/2004 | Galli et al. |
| 2004/0031050 A1 | 2/2004 | Klosterman |
| 2004/0098744 A1 | 5/2004 | Gutta |
| 2004/0103439 A1 | 5/2004 | Macrae et al. |
| 2004/0194138 A1 | 9/2004 | Boylan et al. |
| 2005/0015804 A1 | 1/2005 | LaJoie et al. |
| 2005/0028208 A1 | 2/2005 | Ellis et al. |
| 2005/0028218 A1 | 2/2005 | Blake |
| 2005/0120003 A1 | 6/2005 | Drury et al. |
| 2005/0193414 A1 | 9/2005 | Horvitz et al. |
| 2005/0251822 A1 | 11/2005 | Knowles et al. |
| 2005/0251827 A1 | 11/2005 | Ellis et al. |
| 2005/0265169 A1 | 12/2005 | Yoshimaru et al. |
| 2005/0278741 A1 | 12/2005 | Robarts et al. |
| 2006/0031883 A1 | 2/2006 | Ellis et al. |

(56) References Cited

U.S. PATENT DOCUMENTS

| | | | |
|---|---|---|---|
| 2006/0085825 | A1 | 4/2006 | Istvan et al. |
| 2006/0112410 | A1 | 5/2006 | Poli et al. |
| 2006/0136966 | A1 | 6/2006 | Folk |
| 2007/0067805 | A1 | 3/2007 | Macrae et al. |
| 2007/0143808 | A1* | 6/2007 | Agrawal et al. ............... 725/119 |
| 2007/0157242 | A1 | 7/2007 | Cordray et al. |
| 2007/0204308 | A1 | 8/2007 | Nicholas et al. |
| 2008/0010655 | A1 | 1/2008 | Ellis et al. |
| 2008/0013429 | A1 | 1/2008 | Chen et al. |
| 2008/0184304 | A1 | 7/2008 | Ellis et al. |
| 2008/0184313 | A1 | 7/2008 | Knudson et al. |
| 2008/0184322 | A1 | 7/2008 | Blake |
| 2008/0188213 | A1 | 8/2008 | Mankovitz |
| 2008/0189737 | A1 | 8/2008 | Ellis et al. |
| 2008/0189742 | A1 | 8/2008 | Ellis et al. |
| 2008/0189743 | A1 | 8/2008 | Ellis et al. |
| 2008/0263600 | A1 | 10/2008 | Olague et al. |
| 2009/0019488 | A1* | 1/2009 | Ruiz-Velasco et al. ......... 725/43 |
| 2009/0044226 | A1 | 2/2009 | Ellis et al. |
| 2009/0241144 | A1 | 9/2009 | LaJoie et al. |
| 2010/0251303 | A1 | 9/2010 | Ellis et al. |
| 2010/0333128 | A1* | 12/2010 | Smith et al. ..................... 725/25 |

FOREIGN PATENT DOCUMENTS

| | | |
|---|---|---|
| DE | 44 31 438 | 3/1996 |
| DE | 44 40 174 | 5/1996 |
| DE | 195 02 922 | 8/1996 |
| DE | 195 31 121 | 2/1997 |
| DE | 197 40 079 | 3/1999 |
| EP | 0 439 281 | 7/1991 |
| EP | 0 560 593 | 9/1993 |
| EP | 0 682 452 | 11/1995 |
| EP | 0 753 964 | 1/1997 |
| EP | 0 774 853 | 5/1997 |
| EP | 0 793 225 | 9/1997 |
| EP | 0 795 994 | 9/1997 |
| EP | 0 805 594 | 11/1997 |
| EP | 0 836 320 | 4/1998 |
| EP | 0 843 468 | 5/1998 |
| EP | 0 854 645 | 7/1998 |
| EP | 0 940 983 | 9/1999 |
| EP | 1 099 339 | 5/2001 |
| EP | 1 271 952 | 1/2003 |
| EP | 1 515 549 | 3/2005 |
| EP | 1 538 838 | 6/2005 |
| FR | 2572235 | 4/1986 |
| FR | 2579397 | 9/1986 |
| GB | 2 227 622 | 8/1990 |
| GB | 2 229 595 | 9/1990 |
| GB | 2 256 115 | 11/1992 |
| GB | 2 256 546 | 12/1992 |
| GB | 2 265 792 | 10/1993 |
| GB | 2 275 800 | 9/1994 |
| GB | 2 286 754 | 8/1995 |
| GB | 2 346 251 | 8/2000 |
| JP | 02-045495 | 2/1990 |
| JP | 03-022770 | 1/1991 |
| JP | 03-35451 | 2/1991 |
| JP | 03-059837 | 3/1991 |
| JP | 03-215781 | 9/1991 |
| JP | 04-250760 | 9/1992 |
| JP | 06-014129 | 1/1994 |
| JP | 06-046345 | 2/1994 |
| JP | 08-056352 | 2/1996 |
| JP | 08-242436 | 9/1996 |
| JP | 09-065300 | 3/1997 |
| JP | 09-102827 | 4/1997 |
| JP | 09-120686 | 5/1997 |
| JP | 09-148994 | 6/1997 |
| JP | 09-162818 | 6/1997 |
| JP | 09-270965 | 10/1997 |
| JP | 09-298677 | 11/1997 |
| JP | 11-317937 | 11/1999 |
| WO | WO 87/03766 | 6/1987 |
| WO | WO 88/04507 | 6/1988 |
| WO | WO 89/03085 | 4/1989 |
| WO | WO 90/07844 | 7/1990 |
| WO | WO 91/07050 | 5/1991 |
| WO | WO 91/08629 | 6/1991 |
| WO | WO 92/14284 | 8/1992 |
| WO | WO 92/17027 | 10/1992 |
| WO | WO 92/22983 | 12/1992 |
| WO | WO 94/14282 | 6/1994 |
| WO | WO 94/14284 | 6/1994 |
| WO | WO 94/15284 | 7/1994 |
| WO | WO 95/01056 | 1/1995 |
| WO | WO 95/01058 | 1/1995 |
| WO | WO 95/01059 | 1/1995 |
| WO | WO 95/10910 | 4/1995 |
| WO | WO 95/28055 | 10/1995 |
| WO | WO 95/32585 | 11/1995 |
| WO | WO 95/32587 | 11/1995 |
| WO | WO 96/07270 | 3/1996 |
| WO | WO 96/13932 | 5/1996 |
| WO | WO 96/20555 | 7/1996 |
| WO | WO 96/26605 | 8/1996 |
| WO | WO 96/34491 | 10/1996 |
| WO | WO 96/36172 | 11/1996 |
| WO | WO 96/37075 | 11/1996 |
| WO | WO 96/41478 | 12/1996 |
| WO | WO 97/12486 | 4/1997 |
| WO | WO 97/13368 | 4/1997 |
| WO | WO 97/19565 | 5/1997 |
| WO | WO 97/22207 | 6/1997 |
| WO | WO 97/31480 | 8/1997 |
| WO | WO 97/33434 | 9/1997 |
| WO | WO 97/34413 | 9/1997 |
| WO | WO 97/36422 | 10/1997 |
| WO | WO 97/46943 | 12/1997 |
| WO | WO 97/47106 | 12/1997 |
| WO | WO 97/47124 | 12/1997 |
| WO | WO 97/47143 | 12/1997 |
| WO | WO 97/48230 | 12/1997 |
| WO | WO 97/49237 | 12/1997 |
| WO | WO 97/50251 | 12/1997 |
| WO | WO 98/06219 | 2/1998 |
| WO | WO 98/10589 | 3/1998 |
| WO | WO 98/10598 | 3/1998 |
| WO | WO 98/16062 | 4/1998 |
| WO | WO 98/17064 | 4/1998 |
| WO | WO 98/26584 | 6/1998 |
| WO | WO 98/43183 | 10/1998 |
| WO | WO 98/43416 | 10/1998 |
| WO | WO 98/56173 | 12/1998 |
| WO | WO 98/56176 | 12/1998 |
| WO | WO 99/03267 | 1/1999 |
| WO | WO 99/04570 | 1/1999 |
| WO | WO 99/14947 | 3/1999 |
| WO | WO 99/30491 | 6/1999 |
| WO | WO 99/45700 | 9/1999 |
| WO | WO 99/45701 | 9/1999 |
| WO | WO 99/52279 | 10/1999 |
| WO | WO 99/57839 | 11/1999 |
| WO | WO 99/60783 | 11/1999 |
| WO | WO 99/66725 | 12/1999 |
| WO | WO 00/04706 | 1/2000 |
| WO | WO 00/04707 | 1/2000 |
| WO | WO 00/07368 | 2/2000 |
| WO | WO 00/08850 | 2/2000 |
| WO | WO 00/08851 | 2/2000 |
| WO | WO 00/08852 | 2/2000 |
| WO | WO 00/16548 | 3/2000 |
| WO | WO 00/28739 | 5/2000 |
| WO | WO 00/58833 | 10/2000 |
| WO | WO 00/58967 | 10/2000 |
| WO | WO 00/59214 | 10/2000 |
| WO | WO 00/59233 | 10/2000 |
| WO | WO 00/62298 | 10/2000 |
| WO | WO 00/62299 | 10/2000 |
| WO | WO 00/62533 | 10/2000 |
| WO | WO 00/67475 | 11/2000 |
| WO | WO 01/22729 | 3/2001 |

(56) References Cited

FOREIGN PATENT DOCUMENTS

| | | |
|---|---|---|
| WO | WO 01/46843 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/76239 | 10/2001 |
| WO | WO 01/76248 | 10/2001 |
| WO | WO 02/078317 | 10/2002 |
| WO | WO 03/098932 | 11/2003 |
| WO | WO 2004/054264 | 6/2004 |
| WO | WO 2005/091626 | 9/2005 |

OTHER PUBLICATIONS

"DIRECTV Digital Satellite Receiver—Operating Instructions," Sony Electronics Inc. (2001).
"DIRECTV Receiver—Owner's Manual," DIRECTV, Inc. (2002).
"DIRECTV Receiver with TiVo Digital Satellite Receiver/Recorder SAT-T60—Installation Guide," Sony Corporation (2000).
"DIRECTV Receiver with TiVo Installation Guide," Philips (2000).
"DIRECTV Receiver with TiVo Viewer's Guide" (1999, 2000).
"DishPro Satellite System—User's Guide," Dish Network (undated).
"Fall 2001 TiVo Service Update with Dual Tune!," TiVo Inc. (2001).
"PTV Recorder Setup Guide," Philips (2000).
"RCA Satellite Receiver User's Guide," Thomson Multimedia Inc. (2001).
"Start Here," Sony, TiVo and DIRECTV (undated).
"Electronic Programme Guide (EPG); Protocol for a TV Guide using electronic data transmission" by European Telecommunication Standards Institute, May 1997, Valbonne, France, publication No. ETS 300 707.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"JiniTM Architecture Overview," by Jim Waldo, from the Internet at http://Java.sun.com/products/jini/whitepapers/architectureoverview.pdf/ printed on Jan. 25, 1999. The document bears a copyright date of 1998.
"Reaching your subscribers is a complex and costly process-until now," from the Internet at http://www.evolveproducts.com/info.html, printed on Dec. 28, 1998.
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.
"Using StarSight 2," published before Apr. 19, 1995.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
"Windows 98 Feature Combines TV, Terminal and the Internet," New York Times, Aug. 18, 1998.
Archived Intel Intercast's Website from Archieve. Org, "How Does It Work?", <http://web.archive.org/web/19990429214537/www.intercast.com/intercast/howitwks.htm>, Accessed on Jul. 8, 2008.
Archived Intel Intercast's Website from Archieve. Org, "What Is It?", <http://web.archive.org/web/19990422195517/www.intercast.com/intercast/whatisit.htm>, Accessed on Jul. 8, 2008.
Bach U et al, "Multimediales-TV-Gereat," Radio Fernsehen Electronik, De, Veb, Verlag, Technik, Berlin, vol. 45, No. 9, Aug. 1, 1996, pp. 28, 30-31, XP 000636538, ISSN: 1436-1574 (Translation, pp. 1-5).
Bach U et alk "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841 (Translation, pp. 1-7).
Curt Rogers, "Telcos vs. Cable TV: The Global View," Data Communications, No. 13, New York, pp. 75, 76, 78 and 80, Sep. 1995.
Digital Video Broadcasting (DVB); DVB specification for data broadcasting, European Telecommunications Standards Institute, Draft EN 301 192 V1.2.1 (Jan. 1999).
DiRosa, S. "Pinochle's BIGSURF Netguide", Jul. 1995, vol. 3.1, pp. 260-270.
Hirtz Gentlemen: Et al:, "Open TV: Betriebssystem Fuer Interaktives Fernsehen," Fernseh Und Kinotechnik, de vde Verlag GmbH, Berlin, vol. 50, No. 3, Mar. 1, 1996, pp. 84-89, XP 000581417, ISSN: 0015-0142 (Translation, pp. 1-9).
Hofmann, Neumann, Oberlies, and Schadwinkel, "Videotext Programmiert Videorecorder," Rundfunktechnische Mitteilungen, Nov.-Dec. 1982, pp. 254-257.
Motorola, Inc.; Integrated Datacasting Solutions for Digital Television XP-002204351; Jun. 1999.
Ochiai et al., "@randomTV: A New TV System," NEC C&C Media Research Laboratories, Mar. 17, 1998, pp. 3-302-3-303.
Research Disclosure, No. 329, Sep. 1991, HAVANT GB, p. 657, XP226205, "Installation of consumer apparatus".
Rewind, replay and unwind with new high-tech TV devices, by Lawrence J. Magid, LA Times. This document was printed from the Internet on Jun. 6, 1999 and bears a date of May 19, 1999.
Saito, Takeshi, et al., "Homenetwork Architecture Considering Digital Home Appliance," Technical Committee meeting of The Institute of Electronics, Information and Communication Engineers (IEICE), Japan, Nov. 6, 1997, vol. 97, No. 368, p. 57-64.
Schepp et al., "The Complete Guide to CompuServe," Chapter 7, "IQuest and General Information Gathering," pp. 211-258, (McGraw-Hill Osborne Media, Har/Dis edition 1990).
User's Guide RCA Color TV with TV Plus + Guide, 1997.
Venditto, G., Prodigy for Dummies, IDG Books, pp. 57-63, 213 (1995).
Verknuepfung von TV mit INternet, Funkschau, De, Franzis—Verlag K.G. Munchen, vol. 68, No. 18 Aug. 16, 1996, pp. 70-71, XP 000631189, ISSN: 0016-2841 (Translation, pp. 1- 3).
Von Andreas Neumann, "WDR Online Aufbau Und Perspektiven Automatisierter Online—Dienste Im WDR," Rundfunktechnische Mitteilungen, vol. 41, pp. 56-66, Jun. 1997.
Von Gerhard Eitz, "Zukünftige Informations—Und Datenangebote Beim Digitalen Fernsehen—EPG Und "Lesezeichen"," Rundfunktechnische Mitteilungen, vol. 41, pp. 67-72, Jun. 1997.

* cited by examiner

SYSTEMS AND METHODS FOR MEDIA DETECTION AND FILTERING USING A PARENTAL CONTROL LOGGING APPLICATION

BACKGROUND OF THE INVENTION

This invention relates generally to media detection and filtering, and more particularly, to systems and methods for detecting and filtering media using a parental control logging application.

Due to the overwhelming volume of media content available from a number of different sources (e.g., via television, internet, interactive games, etc.), parental control tools for censoring and controlling access to media content have become increasingly important. These tools have traditionally allowed users (e.g., parents) to restrict access to particular types of media content (e.g., television programs) based on certain media characteristics, such as program titles, ratings, times, or channels. For example, a user of an interactive media guidance application (e.g., an electronic program guide) may inhibit or block a particular television program from being displayed on user television equipment.

However, these parental control tools are often complex and difficult to configure. In many instances, no intuitive mechanism is provided to fine-tune the controls over time. In addition, users must configure different sets of parental control tools for different types of media content, thereby requiring the expenditure of significant time and effort to manage the disparate sets of tools. Personalizing parental control settings on a user-by-user basis (e.g., for different children) only adds to the complexity, quickly leading to an unmanageable array of settings. In sum, contending with numerous parental control tools and copious permutations of settings can easily overwhelm the average user.

SUMMARY OF THE INVENTION

In view of the foregoing, systems and methods for accessing parental control features are provided in accordance with various embodiments of the present invention. In some embodiments, log entries associated with a set of media assets are retrieved from a log data store. Each log entry defines an attempt to access a media asset and includes information identifying the media asset. The log entries may be presented on a display screen and a user selection of a log entry may be received. In response to the user selection, parental control settings assigned to the media asset associated with the selected log entry may be determined. A user may be allowed to modify the parental control settings assigned to the media asset associated with the selected log entry, and the modified parental control settings may be stored in a parental control data store.

A media asset may have one of a number of different media types, including a television program, a program listing, internet content, video content, audio content, an interactive game, a mobile application, and an advertisement. The information identifying the media asset may include a title, an artist, an album, a rating, a genre, a theme, a category, a keyword, a metadata term, a channel, an owner, a link, a unique identification code, a graphic, cover art, a trailer, an audio or video clip, and/or a sponsor.

The parental control settings may include a setting to block the media asset, a setting to permit the media asset, a setting to filter the media asset, a setting to flag the media asset, a setting to provide an alert when an attempt is made to access the media asset, and/or a setting to require approval to access the media asset. In some embodiments, each log entry may include information identifying access restrictions imposed during the attempt to access the media asset, and the imposed access restrictions may be displayed together with the corresponding log entries.

In some embodiments, various media assets related to the media asset associated with the selected log entry may be identified in response to a user indication. The modified parental control settings may then be applied to the identified media assets as well. In one approach, only media assets that have the same media type as the media asset associated with the selected log entry are identified. In an alternative approach, media assets that have a different media type than the media asset associated with the selected log entry are also identified.

In some embodiments, the parental control data store includes parental control information associated with a number of restricted users. Each log entry may include information identifying one of the restricted users associated with the attempt to access the media asset. As such, the aforementioned parental control settings may be determined from the parental control information associated with the restricted user identified in the selected log entry. That same parental control information may be updated to incorporate the modified parental control settings and then stored in the parental control data store.

In some embodiments, one or more restricted users other than the restricted user identified in the selected log entry may be identified in response to a user indication. The parental control information associated with those restricted users may then be updated in the parental control data store to incorporate the modified settings.

In some embodiments, the user is allowed to monitor the activities of one or more restricted users in real time. In one approach, video streams of media assets currently accessed by the restricted users are displayed. In another approach, alerts are provided each time the restricted users attempt to access restricted media assets.

DETAILED DESCRIPTION OF VARIOUS EMBODIMENTS

Figure 1:
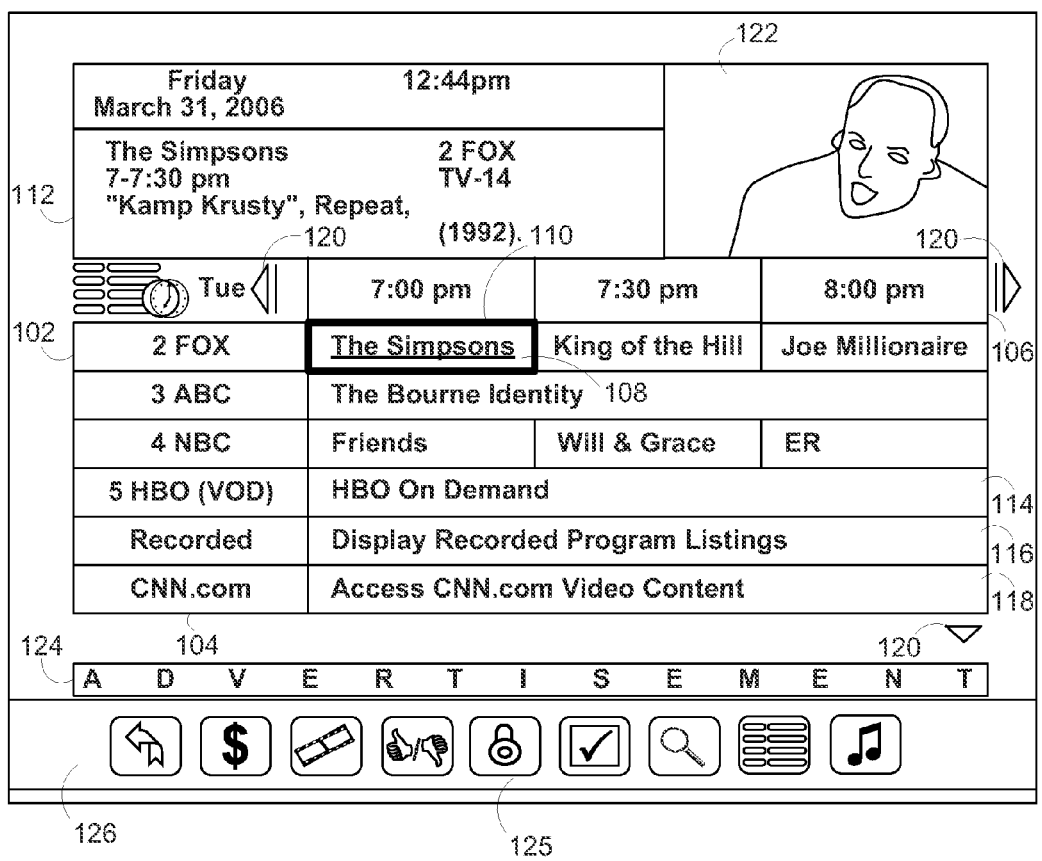
FIG. 1 illustrates an example of a grid display in an interactive media guidance application in accordance with some embodiments of the present invention.

Due to the overwhelming volume of media content available from a number of different sources (e.g., via television, internet, interactive games, etc.), parental control tools for censoring and controlling access to media content have become increasingly important. In accordance with some embodiments, parental control tools are provided that allow a user to restrict access to media content such as textual, audio, graphical, video, or multimedia content. Such content may be provided within a television program, movie, trailer, commercial, advertisement, program listing, interactive game, internet website, mobile application, song, podcast, streaming radio, e-book, etc. Restricting access to media content includes blocking access to the media content, filtering the media content to remove or replace part or all of the media content, flagging the media content, requiring approval to gain access to the media content from another user, and/or setting a time-limit on the duration of access to the media content. For example, parental control tools may be provided that allow a user (e.g., a parent) to restrict access to particular types of media content (e.g., television programs) based on certain media characteristics, such as program titles, ratings, times, or channels.

It should be understood that parental control tools may also allow a user to explicitly permit access to media content. In particular, although the description herein refers primarily to techniques and features related to restricting access to media content, the same techniques and features may apply to permitting access to media content. For example, a user may restrict or permit access to media content based on title, rating, or other suitable information. As another example, a user may restrict or permit access to media content at certain times or according to a defined schedule.

Parental control tools may be provided through any suitable application or user interface. For example, parental control tools may be provided through a website, mobile application, or other Internet-based service. As another example, an application running on a personal computer or other suitable device may provide the parental control tools. In some embodiments, parental control tools are provided through an interactive media guidance application (e.g., implemented on user television equipment). For example, a user of an interactive media guidance application may use the parental control tools to inhibit or block a particular television program from being displayed on user television equipment.

An interactive media guidance application (or, media guidance application) provides an interface that allows users to efficiently navigate media selections and easily identify media assets that they may desire. As used herein, a "media asset" refers to particular media content, such as a television program, movie, trailer, commercial, advertisement, program listing, interactive game, internet website, mobile application, song, podcast, streaming radio, e-book, etc.

Interactive media guidance applications may take various forms depending on the media for which they provide guidance. One typical type of media guidance application is an interactive television program guide. Interactive television program guides (sometimes referred to as electronic program guides) are well-known media guidance applications that, among other things, allow users to navigate among and locate many types of media content (which may be referred to herein as "programs" or "programming") including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Media guidance applications may also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, vehicle entertainment systems, or other mobile devices. On these devices, users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users. FIG. 1 shows an illustrative display screen that may be used to provide media guidance, and in particular media listings. The display screen shown in FIG. 1 (and, for that matter, the display screens shown in FIGS. 2A, 2B, and 6-9) may be implemented on any suitable device or platform. While the display of FIG. 1 is illustrated as a full screen display, it may also be fully or partially overlaid over media content being displayed.

A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, a media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, a media guidance application may also provide access to non-linear programming which is not provided according to a schedule. Non-linear programming may include content from different media sources including on-demand media content (e.g., video-on-demand (VOD)), Internet content (e.g., streaming media, downloadable media, etc.), gaming content (e.g., interactive games accessible through a game console, the internet, etc.), locally stored media content (e.g., video content stored on a digital video recorder (DVR), digital video/versatile disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed may be based on user selection or guidance application definition (e.g., a display of only recorded and broadcast listings, only on-demand and broadcast listings, etc.), and any suitable permutation may be used. As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003/0110499 A1, published Jun. 12, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, purchasing a program, or other features. Options available from a main menu display may include search options, VOD options, parental control options, options to access various types of listing displays, options to subscribe to a premium service, options to edit a user's profile, options to access a browse overlay, or other options. For example, option 125 may provide access to parental control tools for restricting access to media content. In some cases, the parental control tools may restrict access to media assets associated with the displayed listings.

The media guidance application may be personalized based on a user's preferences. A personalized media guidance application may allow a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. Patent Application Publication No. 2005/0251827 A1, published Nov. 10, 2005, Boyer et al., U.S. Pat. No. 7,165,098, issued Jan. 16, 2007, and Ellis et al., U.S. Patent Application Publication No. 2002/0174430 A1, published Nov. 21, 2002, which are hereby incorporated by reference herein in their entireties.

Figure 2A:
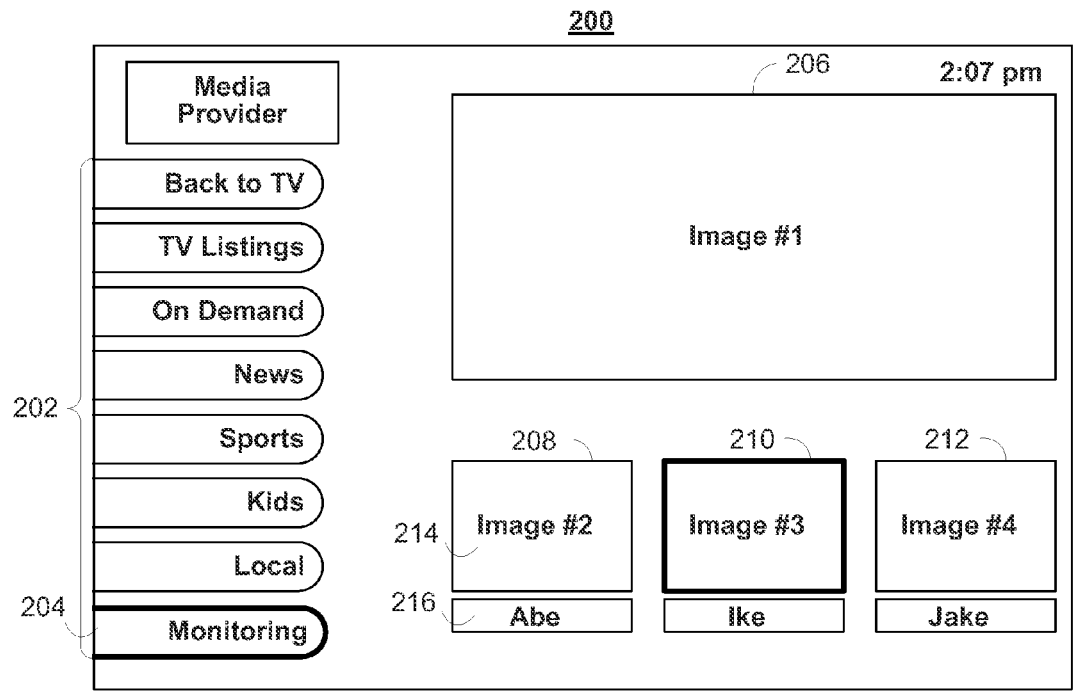
FIGS. 2A and 2B illustrate examples of a user interface for monitoring restricted users in real-time within a media guidance application in accordance with some embodiments of the present invention.
Figure 2B:
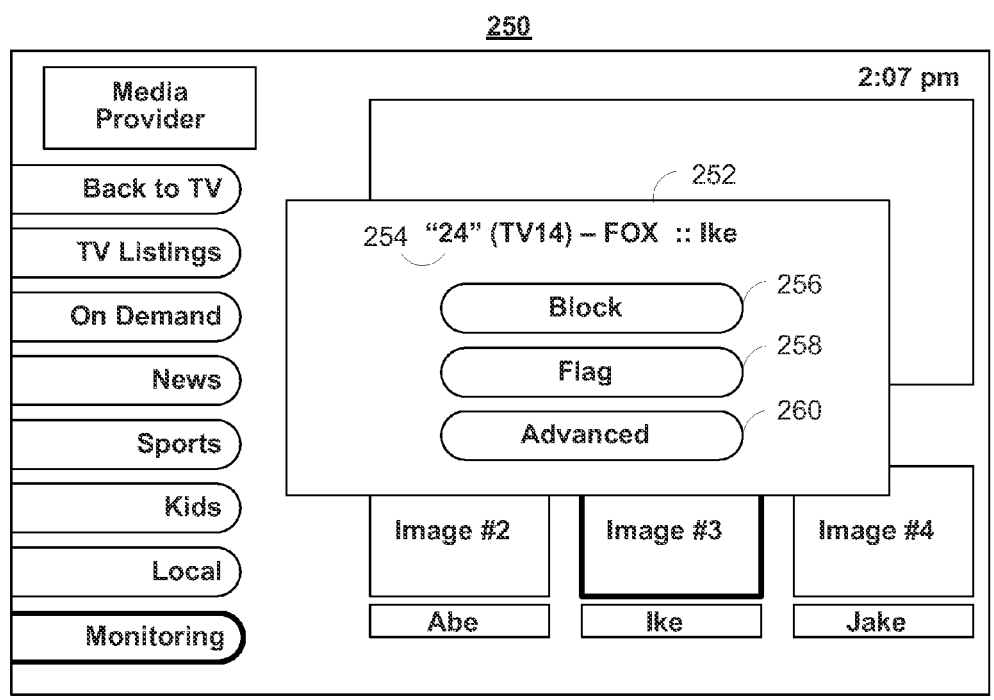

In some embodiments, parental control tools may be provided which allow a user (e.g., a parent) to monitor other users (e.g., children) in real-time. Hereinafter, for convenience, users subject to access restrictions or real-time monitoring may be referred to as "restricted users" and/or "monitored users." FIGS. 2A and 2B depict an exemplary illustration of a display screen 200 that provides a user interface for monitoring restricted users in real-time within a media guidance application, in accordance with some embodiments. It should be understood that although display screen 200 is described as part of a media guidance application, it may be displayed as part of any suitable application (e.g., a mobile application), website, etc. Display screen 200 includes selectable options 202 for media content information organized based on media type, genre, and/or other organization criteria. As shown, monitoring option 204 is selected, thus providing regions 206, 208, 210, and 212 for the display of real-time media content.

Regions 206, 208, 210, and 212 may be associated with real-time media content currently being accessed by a restricted user. The regions may display graphical images including cover art, still images from the real-time media content, video clip previews, live video from the real-time media content, or other types of media representative of the real-time media content. Each of the regions may also be accompanied by text to provide further information about the associated real-time media content. For example, region 208 may include more than one portion, including media portion 214 and text portion 216. Media portion 214 and/or text portion 216 may be selectable to view and/or access the real-time media content. For example, in response to a user selection, real-time media content may be displayed full-screen, in an overlay, or in region 206. As shown, text portion 216 may display a username associated with a restricted user currently accessing the real-time media content.

In some embodiments, a user is presented with overlay 252 (FIG. 2B) when selecting or otherwise indicating one of regions 208, 210, and 212. Overlay 252 may include text portion 254 for presenting a user with identifying information related to the real-time media content associated with the selected region. For example, text portion 254 may include a title, rating, network identifier, and the username of the restricted user currently accessing the media content. Overlay 252 may also provide a user with parental control options 256, 258, and 260 to configure access restrictions for the real-time media content associated with the selected region. In particular, a user may select one of the options to block, flag, or filter the real-time media content. Other parental control features, described herein, may be accessed and configured via option 260. The modified parental control settings may be applied immediately and stored in a data store (e.g., data store 516 of FIG. 5).

In some embodiments, each of regions 208, 210, and 212 is associated with a different user, although, in other embodiments, more than one region may be associated with the same user. It should be understood that fewer or additional regions may be displayed as necessary. Region 206 may display monitored real-time media content associated with restricted users, as discussed above, or it may display live media content (e.g., a television program) currently being viewed by the user himself. This latter configuration allows a user to monitor restricted users while simultaneously retaining access to personally accessed media content. In some embodiments, region 206 may be displayed full screen while regions 208, 210, and 212 are overlaid on top.

Figure 3:
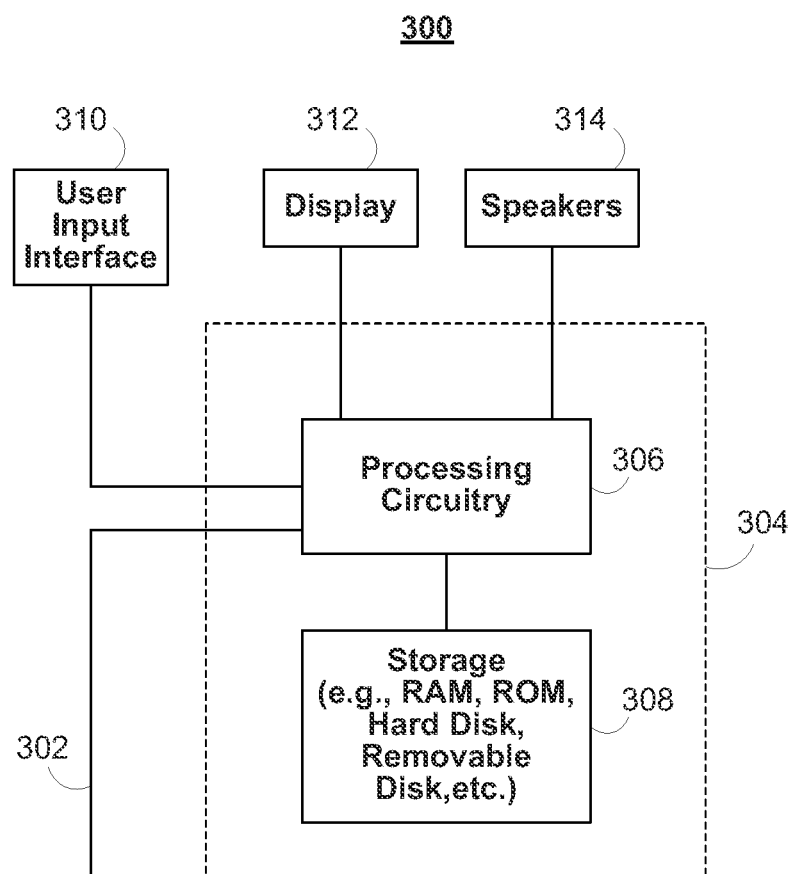
FIG. 3 illustrates an example of a user equipment device in accordance with some embodiments of the present invention.

Users may access media content, a media guidance application, and/or parental control tools (and associated display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, a wireless modem for communications with other equipment, a fiber-optic communications interface, a network interface (e.g., for an Ethernet network), and/or any other suitable interface. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
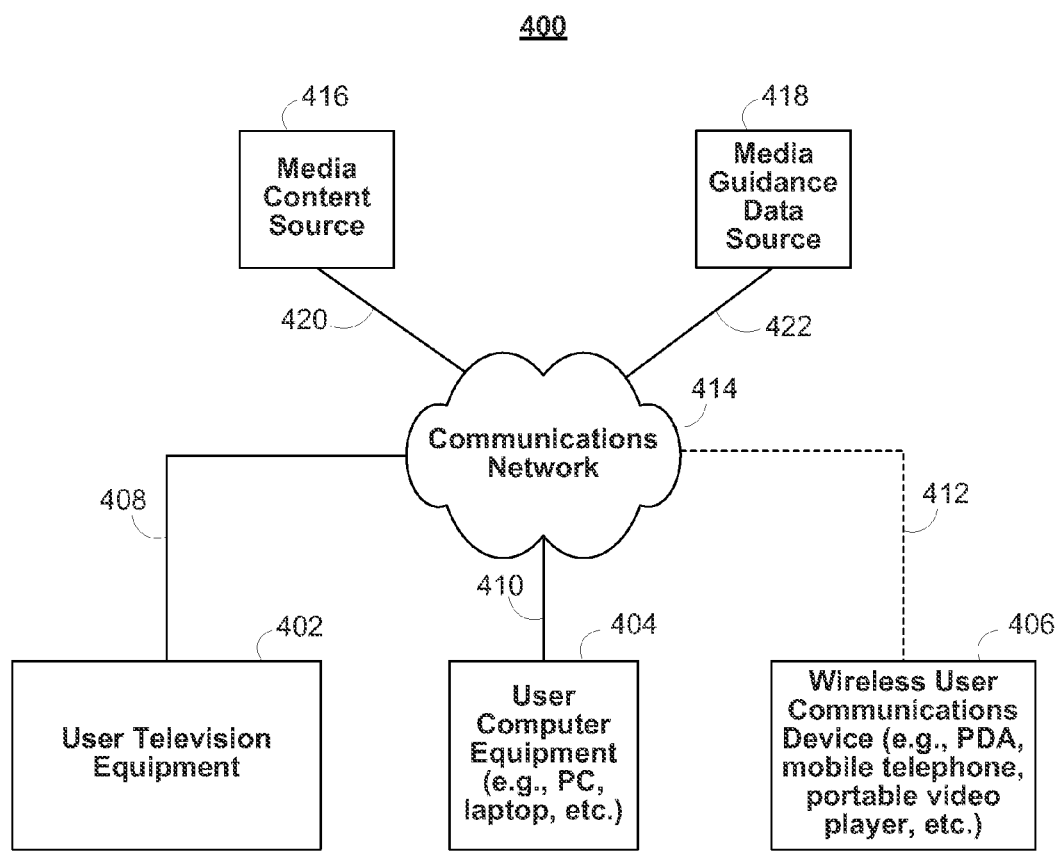
FIG. 4 illustrates an example of a communications system in accordance with some embodiments of the present invention.

User equipment device 300 of FIG. 3 can be implemented in system 400 of FIG. 4 as user television equipment 402, user computer equipment 404, wireless user communications device 406, or any other type of user equipment suitable for accessing media (e.g., a non-portable gaming machine) and/or configuring parental control tools. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV (now known as MSN TV) is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application and parental control tools may also have the same layout on the various different types of user equipment or may be tailored to the display capabilities of the user equipment. For example, on user computer equipment, the guidance application and/or parental control tools may be provided as (or within) a web site accessed by a web browser. In another example, the guidance application and/or parental control tools may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to control, and/or maintain consistent media guidance application settings and/or parental control settings across, in-home devices and remote devices. Media guidance settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel may appear as a favorite on the user's in-home devices (e.g., user television equipment and user computer equipment) as well as the user's mobile devices, if desired. As another example, a user may specify using one device (e.g., a portable device or one mounted in the user's automobile) that a program is to be recorded on another of the user's devices (e.g., the user's home device). Therefore, changes made on one user equipment device can change the guidance experience on another user equipment device, regardless of whether they are the same or a different type of user equipment device. In addition, the changes made may be based on settings input by a user, as well as user activity monitored by the guidance application.

Similarly, when parental control settings are presented through multiple user interfaces, modifications made through one user-interface may be reflected in the other user-interfaces. For instance, a user may update parental control settings using parental control tools provided through a website, and the modified settings may be displayed in a media guidance application providing parental control tools. Regardless of the particular device that stores parental control information, the interactive media guidance application (or other suitable application) may access that information to provide parental control tools to a user.

Furthermore, parental control tools may be used to restrict access to media content on multiple devices. For example, parental control settings may be configured and provided to devices 402, 404, and 406. The settings may be transmitted to the devices automatically at certain time intervals, or they may be provided upon request. In some embodiments, each device may request the settings pertaining to particular media content, e.g., when a user of the device requests access to the particular media content. Parental control settings may also, in some instances, be customized for each device. For example, certain media content may be restricted on one device but not another (e.g., video may be restricted only on mobile equipment to prevent distraction while driving). In addition, parental control settings may be customized based on the capabilities of each device so that each device only receives applicable parental control settings (e.g., video restriction settings may not apply to an audio device lacking video capability).

It should be understood that a user may be provided with a unified parental control management experience. For example, parental control settings may be presented to a user for configuration and then applied to multiple devices. Parental control settings specific to one or more devices may be presented as well, in a single user-interface, such that all settings applicable to all devices may be displayed and configured in a centralized manner. Moreover, the user may access these parental control settings using any suitable device.

For example, an interactive media guidance application may access parental control settings on each of the user's in-home devices and remote devices. If a user sets parental control settings on a television program to restrict access to that television program on, for example, the web site www.tvguide.com on their personal computer at their office, the same television program may appear blocked on the user's in-home devices (e.g., user television equipment and user computer equipment) as well as the user's mobile devices, if desired. As another example, the user may specify using one device (e.g., a portable device) that a television program is to be blocked on another of the user's devices (e.g., the user's home device).

In some embodiments, a device, server, or data store may provide parental control features to one or more applications or other devices such that parental control settings may be modified through a number of different user interfaces. For example, a remote server may store parental control settings and a local device (e.g., television equipment running a media guidance application) may communicate with the remote server to retrieve the parental control settings and other parental control information in order to present parental control tools to the user. As another example, a user may access a website that may display parental control tools configurable by the user. Any of the above-mentioned devices, servers, and data stores may be coupled together, and communicate through, a communications network.

For example, the user equipment devices may be coupled to communications network 414. Namely, user television equipment 402, user computer equipment 404, and wireless user communications device 406 may be coupled to communications network 414 via communications paths 408, 410, and 412, respectively. Communications network 414 may be one or more networks including the Internet, a mobile phone network, mobile device (e.g., Blackberry) network, cable network, public switched telephone network, a satellite network (e.g., a satellite television network or other satellite communications network), or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. Patent Application Publication No. 2003/0149988 A1, published Aug. 7, 2003, which is hereby incorporated by reference herein in its entirety. Media content source 416 may also store and/or provide parental control information. For example, media content source 416 may include data store 516 of FIG. 5, described in further detail below.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

System 400 is intended to illustrate a number of approaches, or network configurations, by which user equipment devices and sources of media content, guidance data, and/or parental control information may communicate with each other for the purpose of accessing media, providing media guidance, and providing parental control features. The present invention may be applied in any one or a subset of these approaches, or in a system employing other approaches for delivering media, providing media guidance, and providing parental control features. The following three approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Application Publication No. 2005/0251827 A1, published Nov. 10, 2005. As another example, it may be desirable for users to maintain consistent parental control settings on different user equipment devices within a home network, as described herein. Different types of user equipment devices in a home network may also communicate with each other to transmit media content and/or parental control information. For example, a user may transmit parental control information from user computer equipment to television equipment, a smart phone, a portable video player, and/or a portable music player.

In a second approach, users may have multiple types of user equipment by which they access media content, obtain media guidance, access parental control information and/or configure parental control settings. For example, some users may have home networks that are accessed by in-home and mobile devices. Users may configure parental control settings for in-home devices via parental control tools (e.g., parental control tools 518 of FIG. 5) implemented on a remote device. For example, users may access parental control tools provided through a website via a personal computer at their office, on a mobile device such as a PDA or web-enabled mobile telephone, on a vehicle-based system that is part of or coupled to a navigation system, etc. The user may set various parental control settings (e.g., access restrictions) using the parental control tools to restrict access to media content on the user's in-home equipment. The parental control settings may be distributed to the user's equipment directly, or upon request by the user's in-home equipment. Various systems and methods for user equipment devices communicating, where the user equipment devices are in locations remote from each other, are discussed in, for example, Ellis et al., U.S. Patent Application Publication No. 2005/0028208 A1, published Feb. 3, 2005, which is hereby incorporated by reference herein in its entirety.

In a third approach, users of user equipment devices inside and outside a home can communicate directly with media content source 416 to access media content. Specifically, within a home, users of user television equipment 402 and user computer equipment 404 may access the media guidance application to navigate among and locate desirable media content. Users may also access the media guidance application outside of the home using wireless user communications devices 406 to navigate among and locate desirable media content. As described below in connection with FIG. 5, users of user equipment devices inside and outside a home can also communicate directly with data sources (e.g., data source 416 and/or data source 418) to access parental control information. This parental control information may be accessed each time media content is accessed, or in advance, e.g., periodically.

It will be appreciated that while the discussion of media content has focused on video content, the principles of media guidance and parental control can be applied to other types of media content, such as music, images, or any other suitable media asset.

Figure 5:
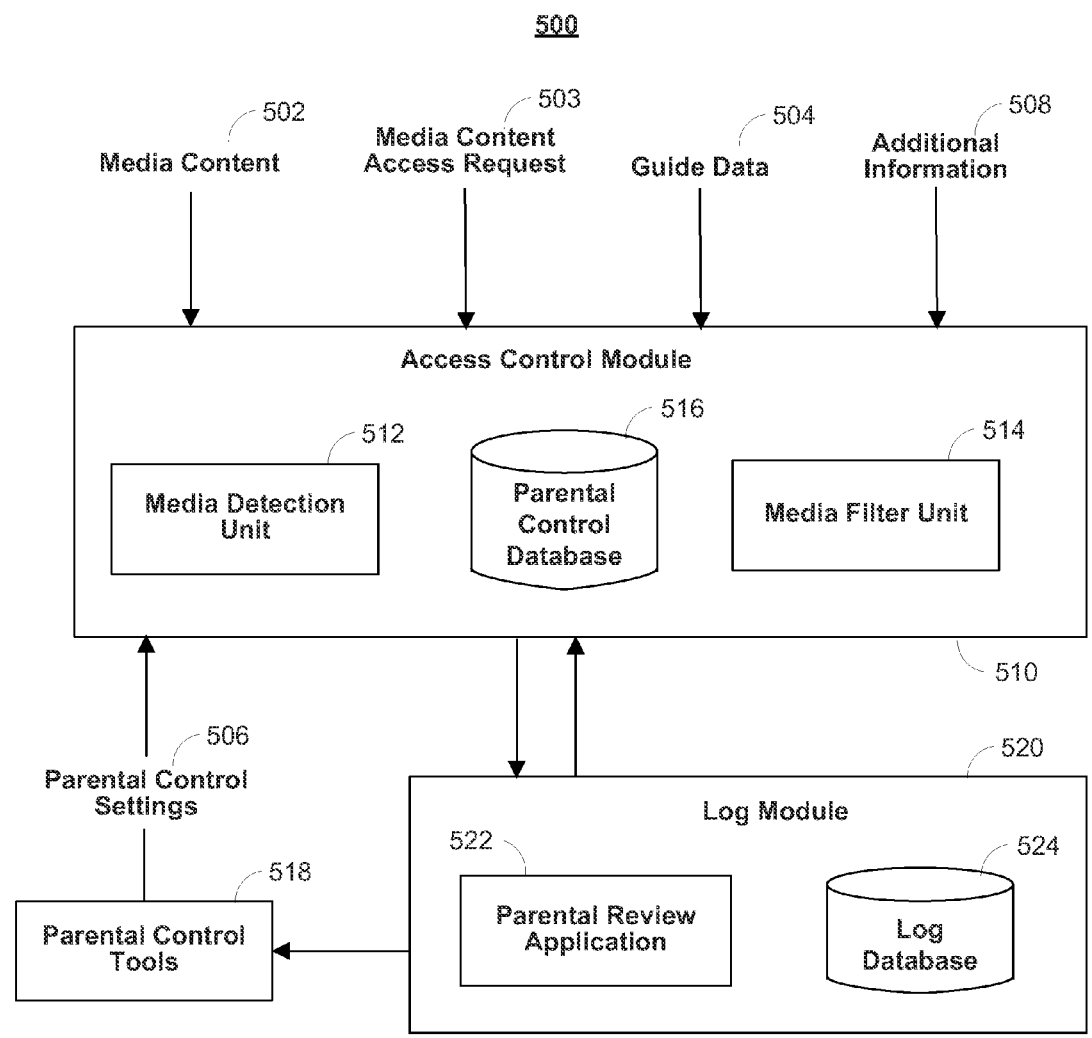
FIG. 5 illustrates an example of a parental control system for implementing parental control settings in accordance with some embodiments of the present invention.

A parental control system 500 for implementing parental control settings is illustrated in FIG. 5 in accordance with one embodiment. Parental control system 500 includes access control module 510 for determining access restrictions (e.g., block, filter, flag, etc.) applicable to media content. Access control module 510 may be implemented within any device capable of accessing media content or it may be implemented at a server (local or remote) capable of receiving and fulfilling media content access requests from other devices. Media content access requests are described in further detail below.

In some embodiments, parental control system 500 may be implemented partly on a local device and partly on a remote server. For example, a user may select an option to view a video through a user interface implemented on a mobile device. Before displaying the video, however, a part of access control module 510 running on the mobile device may send a media content access request 503 to another part of access control module 510 running on a server in order to determine any access restrictions on the requested video. Access control module 510 may determine whether any access restrictions apply and either grant or deny the request, with or without manipulation of the video. In some embodiments, access control module 510 may intercept media content access attempts by the device and generate the appropriate media content access requests 503 to determine whether the access attempt is permitted.

A media content access request 503 defines a request by a user or device (or an application running on a device, set of devices, or through a network) to access media content 502. Request 503 is received by access control module 510, and may include information about the media content requested (including identifying information), the device on which the media content is to be accessed, and/or the user generating the request. Device and/or user information may be retrieved, for example, from a profile maintained on the device or in a central data store (e.g., accessible by a server). Access control module 510 determines whether access to media content 502 should be restricted (e.g., blocked, filtered, flagged, etc.) as described below.

Access control module 510 may identify media content 502 using any suitable data available. In one approach, the media content may be identified from media content access request 503 when the request includes information identifying the media content. In another approach, access control module 510 may extract identifying information from media content 502 itself. For example, media content 502 may be a television program signal with identifying information stored in the vertical blanking interval (VBI) of the signal or within metadata associated with the media content. In yet another approach, access control module 510 may retrieve, extract, or be provided with identifying information from a local data store or external source. For example, media content 502 may be identified from program guide data 504 (e.g., stored in a program listings database) or from additional information 508 (e.g., a website or other internet-based information source). In some cases, media content 502 is identified using a combination of all or some of the aforementioned approaches. Identifying information may include one or more of a title, an artist, an album, a rating, a genre, a theme, a category, a keyword, a metadata term, a channel, an owner, a link, a unique identification code, a graphic, cover art, a trailer, an audio or video clip, a sponsor, etc.

Access control module 510 may access data store 516 to retrieve parental control information. The parental control information may be used to determine access restrictions applicable to media content 502. In some instances, the parental control information may define access restrictions particular to media content 502 and/or access restrictions applicable to all media content, media content of a certain type, or some other subset of media content. The parental control information may also define access restrictions for media content particular to certain devices and/or users.

It should be noted that parental control information may include, for example, restricted television programs, restricted program titles, restricted channels, restricted ratings, restricted actors, restricted producers, restricted musical artists, restricted sponsors, restricted metadata terms, restricted themes, restricted genres, restricted categories, restricted time periods, restricted limits for purchasing content, and/or any other suitable restrictions.

Moreover, parental control information may define access restrictions dependent on conditional or situational data. For example, a child may be prevented from viewing video on any device during school hours. As another example, video may be disallowed on any mobile device when a determination is made that the user of the device is driving (e.g., based on a determination of speed, activation of a GPS application, etc.). As yet another example, different access restrictions may be defined for a restricted user between the ages of two to five, a restricted user between the ages of six to eight, a nine year old restricted user, etc.

In some embodiments, the parental control information may define access restrictions dependent on a rating associated with media content 502. The rating may be provided with the information identifying media content 502, or it may be retrieved from guide data 504 (e.g., stored in a database of program listings). Rating information may also be determined from additional information 508, for example, a remotely accessible database or internet service (e.g., from data provided through the Internet Movie Database at imdb.com). In some embodiments, additional information 508 may include a number of ratings from multiple sources, which may be averaged or otherwise combined. For example, a number of websites or databases may provide differing rating information. As another example, user provided ratings may be tallied (e.g., by a server, or by an internet service or social networking website) and provided via additional information 508.

Parental control information may include parental control settings 506 generated and/or modified using parental control tools 518 accessible through any suitable user interface. For example, parental control information may include settings configured by a user using parental control tools provided by a media guidance application, website, software application (e.g., mobile application), etc. In some embodiments, parental control information may include predetermined settings, e.g., a device or application may come packaged with pre-defined parental control settings. Media content itself may also include predefined parental control settings or a link/pointer to the same. In other embodiments, parental control information may be developed automatically, based on user viewing history, other profile data, or a compilation of parental control settings configured by other users. For example, a server with access to the parental control settings of multiple connected devices (e.g., through a cable network) may produce recommended settings based on that information, which may be automatically adopted. Techniques for generating recommended settings based on the parental control settings of other users is described in detail in U.S. patent application Ser. No. 12/177,783, filed Jul. 22, 2008, which is hereby incorporated by reference herein in its entirety. Parental control settings 506 may be stored in data store 516.

A device may be registered or otherwise connected to parental control system 500, at which time the device may provide parental control information specific to that device in the form of data identifying possible access restrictions recognized by the device and/or predefined or previously configured parental control settings. The device-specific parental control settings may be stored in data store 516 (e.g., as part of the stored parental control information). Thereafter, the device-specific parental controls settings may be configurable using any suitable user interface available within the system (e.g., a website with access to data store 516). Any updated settings applicable to the device may be transferred to the device at any suitable time, e.g., periodically or upon request. Alternatively, as described above, the device may offload access restriction determination to a server and simply issue media content access requests, as necessary, that are either granted or denied by the server.

Returning to FIG. 5, access control module 510 may receive media content access request 503 and identify the requested media content 502 from information included with request 503, within media content 502, guide data 504, and/or additional information 508. The identifying data may include any suitable associated criteria (e.g., media content type, title, rating, etc.) for use in determining access restrictions applicable to the media content. Access control module 510 may interface with data store 516 to determine the access restrictions applicable to the media content. These restrictions may depend on the device and/or user accessing the media, and access control module 510 may therefore retrieve or be provided with device/user information (e.g., via media content access request 503 or additional information 508). In some circumstances, access control module 510 queries the initiating device for device and/or user information. In other circumstances, device and/or user information can be retrieved from a data store that maintains a log of connected devices and/or users (e.g., a log maintained at a local or remote server). Device and/or user information may also be stored in a profile on the device or at a remote location.

In some embodiments, access control module 510 is configured to detect objectionable content within media content 502. Audio/video detection unit 512 may analyze media content 502 to identify text, graphics, video, and/or audio that the user may deem inappropriate. Audio/video detection unit 512 may be a hardware or software component and may be part of or interface with access control module 510. Techniques for identifying objectionable material are described in detail in U.S. patent application Ser. No. 12/649,910, filed Dec. 30, 2009, which is hereby incorporated by reference herein in its entirety.

Access control module 510 may automatically detect objectionable content within media content 502 regardless of the particular parental control settings applicable to media content 502. For example, all media content viewed by a user may be monitored and analyzed on a continual basis. Alternatively, access control module 510 may detect objectionable content within media content 502 only when certain parameters are met. For instance, access control module 510 may automatically detect objectionable content within media content 502 only when a user indicates, via a parental control setting, a desire to monitor all media content. A user may also specify a subset of media content to be monitored and analyzed (e.g., all media content of a particular type, all media content of a particular rating, etc.). A user may also configure access control module 510 to monitor and analyze media content for specific users or devices. In some instances, multiple parameters may require fulfillment for monitoring to commence. For example, a user may specify that only video content accessed by a certain user on a mobile device should be monitored and analyzed. It should be understood that any suitable criteria may be used for determining which media content is to be monitored for objectionable material. The criteria may be fully definable by a user using parental control tools (e.g., parental control tools 518).

In one scenario, access control module 510 uses data from multiple sources to determine access restrictions according to parental control settings. For example, parental control settings may specify that media content should be blocked or filtered when guide data 504 indicates objectionable material is contained in the media content and when the results of audio/video detection (e.g., determined using unit 512) indicates such objectionable material is indeed present. A measure of objectionability may be developed incorporating the results of some or all of the above techniques for determining whether media content contains objectionable material. The measure may indicate, on a scale (e.g., 1-10) a probable relative level of objectionability. For example, a low value may indicate that the media content under review has a low probability of containing objectionable material, while a high value may indicate the opposite. A user may configure parental control settings to restrict access to media content that is determined to have a measure of objectionability above a user-defined threshold.

A user may specify what kind of material should be considered objectionable by access control module 510. Potential objectionable material may include, for instance, depictions of sex, nudity, violence, racism, discrimination, cultural or religious insensitivity, or other obscenities. Potential objectionable material may also include suggestion and/or discussion of the same. In addition, vulgar language, crude humor, profanity, sexual dialogue, and certain other types of discussion may be considered objectionable. Furthermore, a user may specify an amount or level of objectionable material that needs to be met to trigger access restrictions. For example, a user may configure parental control settings so that only media content containing extreme violence is blocked. As another example, a user may configure parental control settings so that only media containing four or more expletives is blocked. A user may also specify exceptions to general settings. For example, a user may configure parental control settings so that violence depicted in a news broadcast is permitted.

The above-described access restriction determination techniques may be performed sequentially, as series of steps (in any order), or they may be performed concurrently and used in combination.

In some embodiments, objectionable material within media content may be removed or replaced. Audio/video filter unit 514, for example, may be configured to remove or replace objectionable material detected by audio/video detection unit 512. Techniques for removing or replacing objectionable material within media content is discussed in further detail in U.S. patent application Ser. No. 12/649,910, filed Dec. 30, 2009, which was previously incorporated by reference herein in its entirety.

In some embodiments, media content access requests and/or information related to accessed media content may be recorded and maintained for later review. Log module 520, for example, may interface with access control module 510 to record and maintain information provided by, or retrieved from, the module and its accompanying data stores. Log module 520 may have access to any suitable information, including media content 502, media content access request 503, guide data 504, the parental control information within data store 516, and additional information 508. Log module 520 may also have access to the results of any determination made by access control module 510, e.g., any access restrictions determined to be applicable to media content 503. Log module 520 may store any or all of the aforementioned information, or a record of the information, in log database 524. For example, log module 520 may generate and store log entries associated with media content access requests and/or accessed media content in database 524. The contents of log database 524 may be accessed by parental review application 522 and presented to a user, as will be described in further detail below.

Parental review application 522 may be accessible from any suitable device or application, and may be accessible through a website. For example, a user may select an icon (e.g., option 125 of FIG. 1) within a media guidance application to access the parental review application. In some embodiments, only authorized users (e.g., parents) have access to parental review application 522. As such, a password or another form of identification may be required to gain access to parental review application. In other embodiments, restricted users have access to parental review application 522, but may be presented with only a subset of information and/or prevented from modifying any settings. For example, a restricted user may only be presented with log entries associated with that particular restricted user.

Parental review application 522 may provide a user interface for reviewing information stored in log database 524, information gathered from access control module 510, and/or parental control information stored in data store 516. Exemplary illustrations of such a user interface are provided by the display screens of FIGS. 6 and 7, described in detail below. Parental review application 522 may also allow a user to review the parental control settings applicable to media content associated with the log entries, as well as the access restrictions already applied to previously accessed media content. Moreover, the parental control settings may be modified using parental control tools provided by parental review application 522. Modified settings may be transmitted to access control module 510 and/or stored in data store 516.

It is noted that any or all components within parental control system 500—including access control module 510, log module 520, and parental control tools 518—may be implemented as processing circuitry and/or as software implemented using processing circuitry (e.g., as computer-readable instructions encoded on a computer-readable medium and executed using a processor). This processing circuitry may be incorporated within user equipment (e.g., control circuitry 304 of user equipment device 300 of FIG. 3) and/or within a data source (e.g., a local or remote server). In some embodiments, the components of parental control system 500 may be implemented across a number of user equipment devices (e.g., devices 402, 404, and 406) and/or data sources (e.g., data sources 416 and 418 of FIG. 4). In particular, access control module 510 may be implemented in part or in whole on a number of devices and/or data sources. For example, media detection unit 512 and media filter unit 514 may be implemented on all user equipment devices used (e.g., by restricted users) to access media. As another example, parental control database 516 may be located at a data source accessible to all the user equipment devices. Similarly, log module 520 may be implemented in part or in whole on a number of devices and/or data sources. For example, parental review application 522 may be implemented using processing circuitry on a user equipment device (e.g., user television equipment), and log database 524 may be located at a data source accessible to all the user equipment devices (e.g., via the Internet). When the components of parental control system 500 are distributed on a number of devices and/or data sources, they may communicate with each other directly and/or through communications network 414, using any suitable protocol. For example, data (e.g., log data, parental control data, etc.) may be transmitted between devices using the hypertext transfer protocol ("HTTP").

Figure 6:
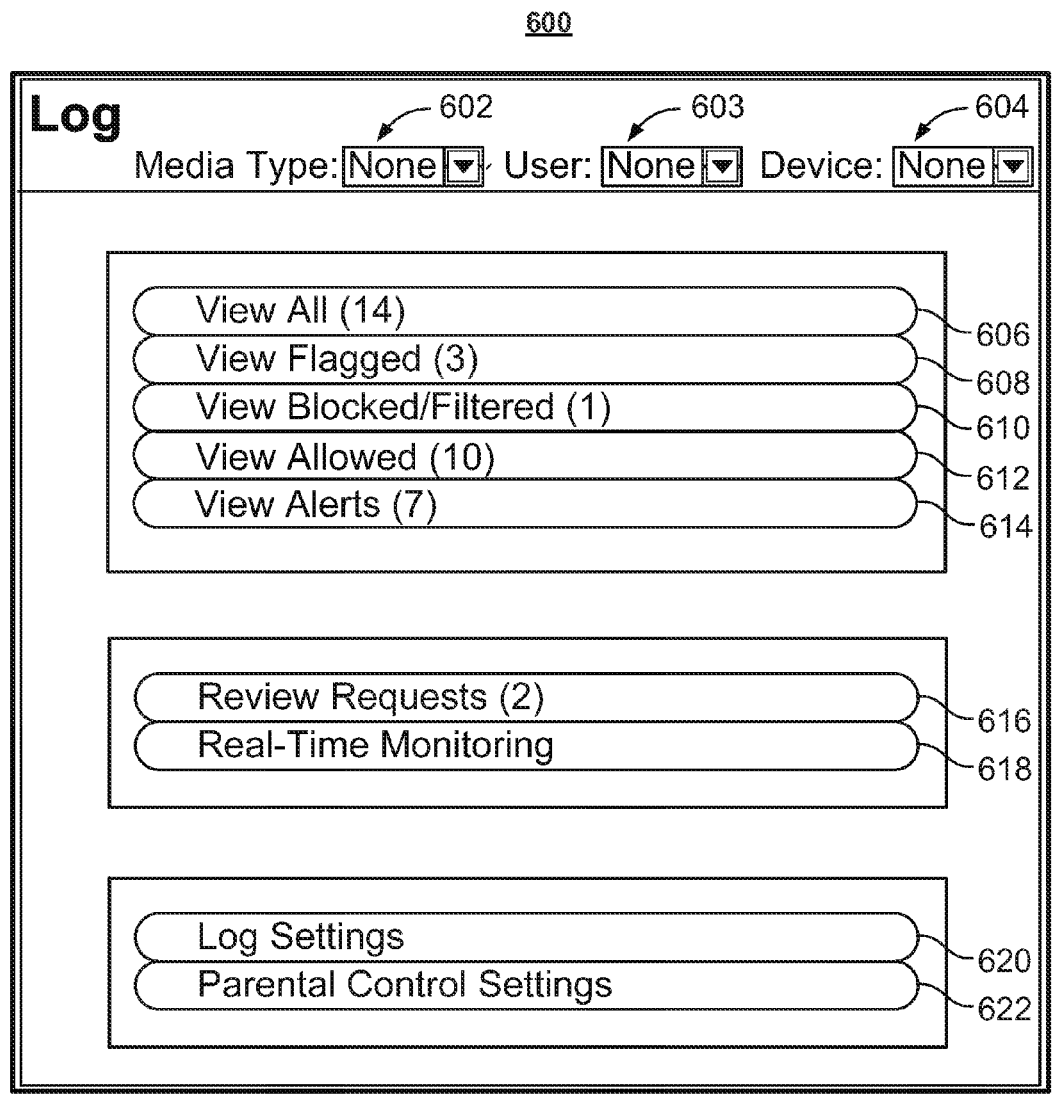
FIG. 6 illustrates an example of a user interface for accessing options provided by a log module in accordance with some embodiments of the present invention.

FIG. 6 depicts an exemplary illustration of a display screen 600 that provides a user interface for accessing features of parental review application 522 and/or information available to log module 520. A user may invoke display screen 600, in some instances, by selecting an on-screen option (e.g., in a media guidance application or website) or pressing a dedicated or assignable button on a user input device. For example, a user may select option 125 of FIG. 1 to access display screen 600. As shown, display screen 600 allows a user to view log entries stored in log database 524. A user may select from a set of options to view the log entries. The options, as shown, allow a user to view entries corresponding to: all logged media content (option 606), flagged media content (option 608), blocked and filtered media content (option 610), or unrestricted media content (option 612). An indication of the number of log entries corresponding to each option may be displayed, as shown. The indications may reflect the total number of log entries available for review or the number of log entries not yet reviewed (i.e., "unread"). Selecting any of options 606-612 may cause another display screen to be presented with the requested log entries displayed, as will be described below in connection with FIG. 7.

Display screen 600 also allows a user to view any alerts generated by access control module 510 (option 614). Access control module 510 may generate alerts in a number of scenarios in accordance with parental control settings. In one scenario, an alert may be generated each time media content is flagged, blocked, and/or filtered. In another scenario, an alert may be generated when user-designated media content, or a user-designated subset of media content, is accessed. For example, a user may specify that an alert should be generated anytime an episode of "24" is accessed (e.g., when a media content access request is received). In yet another scenario, an alert may be generated whenever a certain user or device initiates a media content access request. It should be understood that parental control settings may be configured such that an alert is generated upon satisfaction of any suitable criteria. For example, an alert may be generated anytime access control module 510 determines an access restriction applies to media content 502. A user may configure parental control settings to generate an alert in the same way access restrictions are designated.

An alert may include any suitable information pertaining to the event triggering the alert. For example, an alert may include any of the information that may be stored as a log entry, discussed above, or may simply indicate an alert has been generated. Additional information pertaining to, but not included in, the alert may be accessed through parental review application 522 or via a link provided within the alert. Alerts may be stored in log database 524 and reviewed later via parental review application 522 (e.g., via option 614 of FIG. 6).

An alert may also be transmitted to any suitable user device for display using any suitable user-interface provided by the receiving device. For example, an alert may be transmitted to a user's phone (e.g., via text message) or to user television equipment (e.g., as metadata). An alert may also be transmitted (e.g., uploaded or sent via email) to a server for later retrieval. In some cases, the server may provide the alert to the user, e.g., upon request or at periodic intervals (e.g., using "push" technology). For example, an alert may be provided within an email message, a web feed (e.g., RSS), or a social networking service (e.g., as a "tweet" or "status update"). In some embodiments, an alert may be transmitted to a device implementing, in whole or in part, access control module 510 (e.g., as a mobile application), which may be configured to receive and process alerts. For instance, an alert may be automatically displayed upon receipt.

It should be understood that an alert may be transmitted to more than one device or server. A user may specify devices or other suitable destinations for an alert using parental control tools (e.g., parental control tools 518 or the tools provided within parental review application 522 of FIG. 5). It should further be understood that the alert may be generated by and/or transmitted from the user device requesting access to the media content, or the alert may be generated by and/or transmitted from any other device or server implementing access control module 510 in whole or in part (e.g., data sources 416 or 418 of FIG. 4).

In some embodiments, restricted users may request access to blocked or filtered content. Requests may be transmitted to a user for approval or denial. Alternatively, or in addition, requests may be stored in log database 524 and accessed using parental review application 522. Returning to FIG. 6, display screen 600 may provide a user with option 616 to review user access requests. Techniques for receiving user requests to access restricted media content, as well as parental control features for allowing or denying the media content in response, are described in further detail in U.S. patent application Ser. No. 11/607,599, filed Dec. 1, 2006, which is hereby incorporated by reference herein in its entirety.

Display screen 600 may also provide a user with access to real-time monitoring (option 618), log settings (option 620), and parental control settings (option 622). Real-time monitoring allows a user to review the current media content being accessed by one or more restricted users, and is described in greater detail below in connection with FIG. 8. Log settings define the behavior of log module 520 (FIG. 5), and parental control tools allow a user to review and/or modify parental control settings. Option 622 may link to or implement, for example, parental control tools 518 of FIG. 5.

The log entries, alerts, and requests accessible through options 606-616 may be filtered according to user-defined criteria. In particular, applying a filter may cause options 606-616 to present, upon selection, only those log entries, alerts, and requests that meet the specified filter criteria. Similarly, the displayed indications associated with each option may indicate only the corresponding numbers of log entries, alerts, and requests that meet the specified filter criteria. A user may apply any suitable criteria using filter controls allowing selection of filter criteria. For example, filter criteria may include media type (filter control 602), user (filter control 603), and/or device (filter control 604). It is noted that multiple filters may be applied simultaneously.

Figure 7:
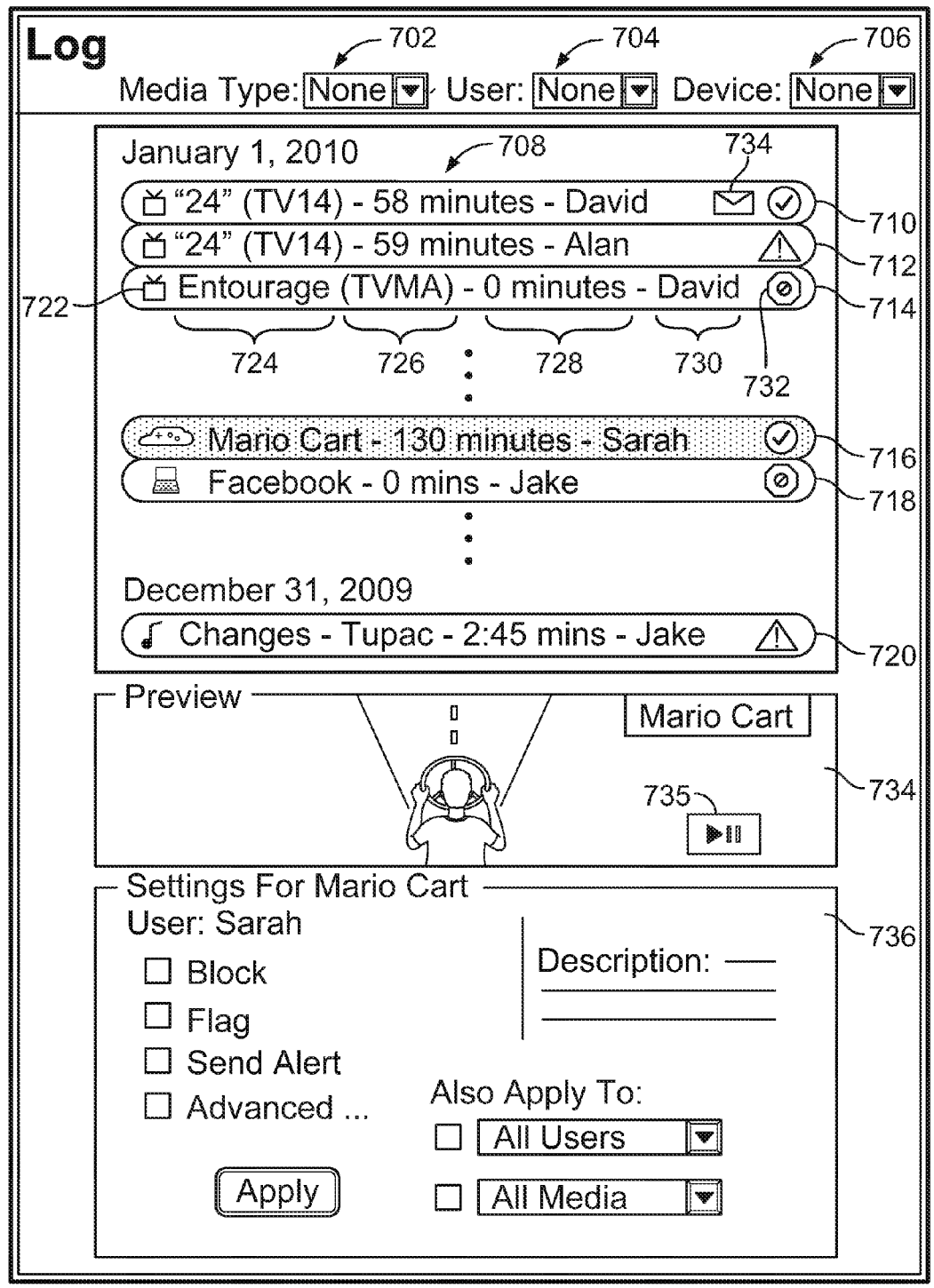
FIG. 7 illustrates an example of a user interface for reviewing log entries and accessing parental control features in accordance with some embodiments of the present invention.

FIG. 7 depicts an exemplary illustration of a display screen 700 that provides a user interface for reviewing log entries and accessing other features of parental review application 522 of FIG. 5. As shown, display screen 700 allows a user to review log entries stored in log database 524 of FIG. 5. The log entries may be presented as a list 708 organized by date, with the latest entries at the top of list 708. For example, list 708 presents log entries 710-720 in order of date and time. The log entries may also be sorted by alternative criteria. For example, list 708 may display the entries sorted by media type, user, or device.

It should be understood that display screen 700 is only exemplary, and that log entries may be accessed and displayed on any suitable user device through any suitable user-interface provided by the device. Moreover, the log entries may be provided to the user upon request, or at periodic intervals (e.g., using "push" technology). For example, log entries may be accessible through a web feed (e.g., RSS), or a social networking service (e.g., via a Facebook application).

As discussed above, log entries may be generated by log module 520 of FIG. 5. In some embodiments, log entries are generated each time a media content access request is received by access control module 510 of FIG. 5. In other embodiments, log entries are generated only when a media content access request results in an access restriction (i.e., the requested media content is restricted by the parental control settings). In generating log entries, log module 520 may interface with access control module 510 to record information provided by, or retrieved from, the module and its accompanying data stores. The log entries may be generating from, and/or include, any suitable information, including data derived from media content 502, media content access request 503, guide data 504, the parental control information within data store 516, and additional information 508 (all of FIG. 5). The log entries may also include information on any access restrictions applied to the requested media content (e.g., as determined by access control module 510). The log entries may be stored in log database 524.

Each log entry is associated with particular media content and may display information related to that media content. In particular, each log entry may display an icon indicative of media type, a title, a rating, and/or any other suitable information. For example, as shown in connection with log entry 714, an icon 722 may be displayed indicating media type (i.e., a television program), title 724 may be displayed identifying the media content (i.e., "Entourage"), and rating 726 may be displayed indicating a level of appropriateness (i.e., "TVMA"). Log entries 710, 712, 716, 718, and 720 illustrate examples of other media type icons (e.g., indicative of an interactive game, website, song, etc.), titles, and/or ratings. Unavailable or inapplicable information may not be included in a log entry, or a default data item may be displayed in its place. For example, log entries 716, 718, and 720 do not include rating information.

Each log entry may also include contextual information related to the media content access request that produced the entry. In particular, each log entry may include a time indication that displays either the total duration of the media content (if applicable) or the duration of time for which the media content was successfully accessed. Each entry may also include a username associated with the user who initiated the media content access request, as well as an icon indicating any access restriction applied to the media content. In addition, each entry may include an indication of the device that generated the media content access request. For example, as shown in connection with log entry 714, time indication 728 may display the total duration for which the user associated with username 730 accessed the media content (i.e., "0 minutes" since access was blocked). Username 730 may also be displayed identifying the user who initiated the media content access request (i.e., "David") and icon 732 may be displayed indicating the access restrictions applied to the media content as a result (i.e., blocked). In some embodiments, another icon may be provided indicating whether an alert was sent upon receipt of the media content access request (e.g., by access control module 510 of FIG. 5). For example, icon 734 displayed within log entry 710 may indicate that an alert was generated. It should be understood that any suitable visual or audible indications may be used to relay information associated with the log entries. Moreover, it should be understood that any suitable identifying or contextual information may be presented to the user within the log entries (i.e., in list 708), and that the user may be allowed to customize which information is presented within the log entries (e.g., by selecting option 620 of FIG. 6).

List 708 may be scrollable, so that additional log entries may be displayed within display screen 700. The user may also be allowed to delete or modify the log entries of list 708, or to reorder the entries. A filter may be applied to the log entries, as described above in connection with FIG. 6, using filter controls 702, 704, and 706.

A user may select (e.g., highlight, click, touch, verbally identify, or otherwise indicate) a log entry in list 708 to retrieve additional information related to the selected entry and/or to perform a function with regard to the selected entry. Referring again to FIG. 7, display screen 700 shows log entry 716 selected, as indicated by the shading applied to the log entry.

In some embodiments, when a log entry is selected in list 708, a preview of the associated media content is displayed (i.e., a "preview element"). Preview elements may be displayed in a particular region of display screen 700, e.g., preview pane 734. Alternatively, preview elements may be displayed in an overlay. As shown, preview pane 734 displays a preview of the media content associated with selected entry 716 (i.e., "Mario Cart"). A preview element may be a textual description, a graphic (e.g., cover art), an audio clip, a video trailer, or some other media element indicative of the media content. In some cases, the preview element may in fact be the media content itself.

Preview pane 734 may include, when applicable, media controls 735 for controlling playback of a preview element. These controls may allow the user, for instance, to play, pause, stop, rewind, and fast forward the preview element. Preview pane 734 may also include information related to the media content (e.g., identifying information). This information may be displayed alongside or over the preview element. The size of preview pane 734 may be user-adjustable, and/or may be automatically resized as needed to display its contents.

In some embodiments, when a log entry is selected in list 708, parental control settings for the media content may be displayed. The parental control settings may be displayed in settings region 736, and may initially reflect the last known configuration of parental control settings for the media content. For example, the parental control settings may be retrieved from data store 516 of FIG. 5. Settings region 736 may display any specific information associated with the parental control settings, such as the user and/or device (or users and/or devices) to which the settings are associated.

The parental control settings may include settings to block or flag the media content and/or to send an alert when the media content is accessed. Advanced settings may also be provided for fine tuning the access restrictions and/or to configure media filtering (e.g., remove or replace functions). For example, the advanced settings may allow the user to specify that "related" media content should be subjected to the same parental control settings. The parameters for determining "related" content may also be configurable by the user. For instance, options may be provided to identify related content via shared identifying information (e.g., same title, same genre, etc.). Locating and applying parental control settings to "related" media is described in detail in U.S. patent application Ser. No. 12/177,783, filed Jul. 22, 2008, which was previously incorporated by reference herein in its entirety.

The parental control settings may be modified and applied to the media content, in which case all future access to the media content is subject to the modified settings. For example, the new settings may be stored in data store 516 of FIG. 5. When an option is selected to apply the settings to related media, a search for "related" media content may be initiated and the settings applied to the results. Unless the user indicates otherwise, the modified parental control settings may be applied only for the restricted user, device, and/or media type associated with the log entry. However, options may be provided to allow the user to apply the settings to other restricted users, devices, and/or media types.

Figure 8:
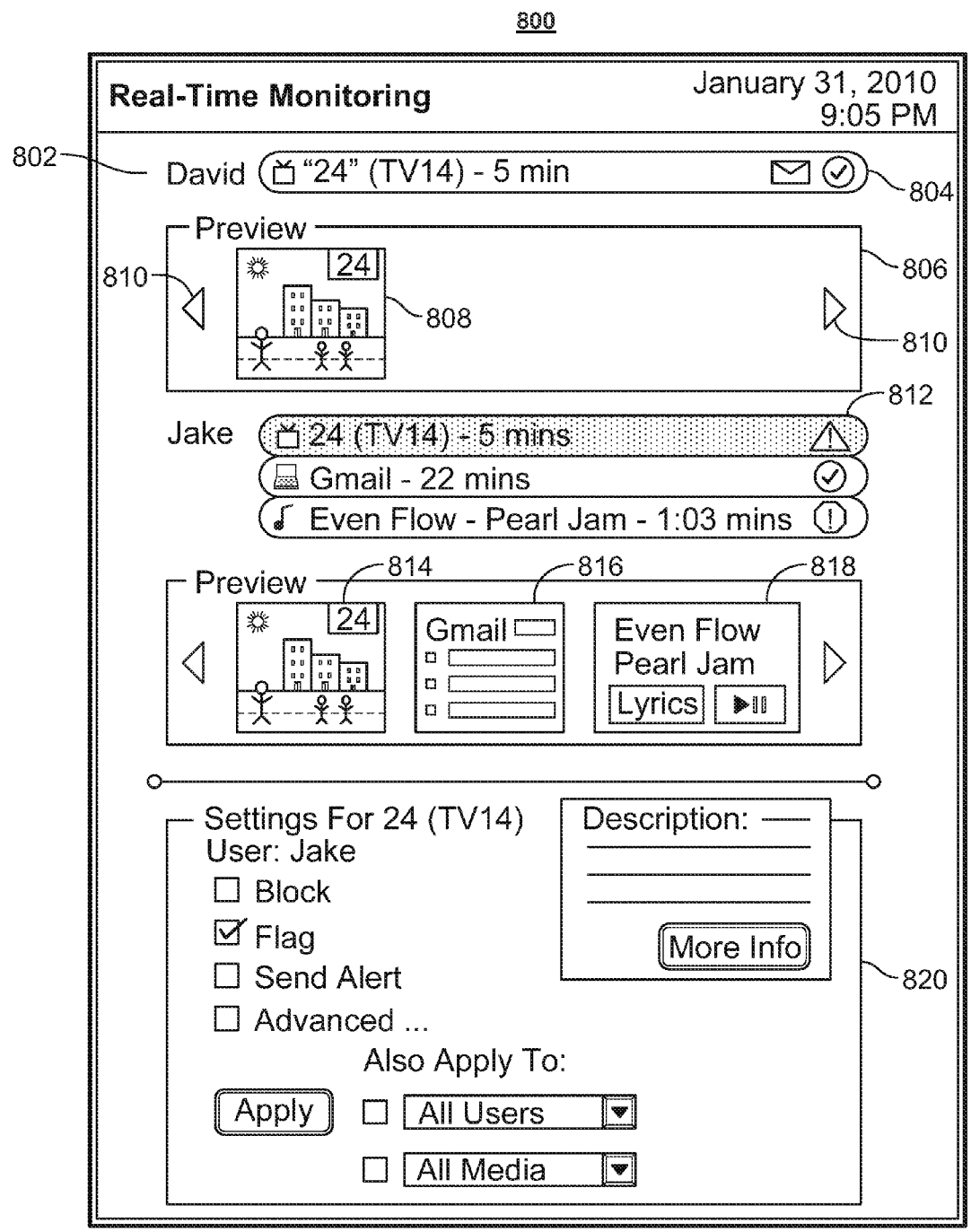
FIG. 8 illustrates an example of a user interface for monitoring users in real-time and accessing parental control features in accordance with some embodiments of the present invention.

FIG. 8 depicts an exemplary illustration of a display screen 800 that provides a user interface for monitoring restricted users in real-time and accessing other features of parental review application 522 of FIG. 5. Display screen 800 may be accessed, for example, via option 618 of FIG. 6. As shown, display screen 800 allows a user to review the media content currently being accessed by one or more restricted users. The media content may be organized by restricted user (as shown), or the media content may be organized by other suitable criteria (e.g., by media content type, title, applied access restriction, etc.). For each restricted user, display screen 800 may display a username (e.g., username 802), entries identifying the media content being accessed (e.g., entry 804), and a preview pane for previewing the media content being accessed (e.g., preview pane 806).

Real-time entries may contain some or all of the same data items displayed within log entries, described in connection with FIG. 7. In particular, real-time entries may include an icon indicative of the media type of the media content, the title and rating of the media content, and/or any other suitable identifying information. Real-time entries may also include a time indication that displays the duration of time for which the media content has been successfully accessed, and/or an icon indicating an access restriction applied to the media content. In addition, an icon may be provided indicating whether an alert was sent when the media content was accessed (e.g., upon initiation of a media content access request).

It should be understood that any suitable visual or audible indications may be used to relay information associated with the real-time entries. It should also be understood that any suitable identifying or contextual information may be presented to the user within the real-time entries. In some embodiments, the user may be allowed to customize which information is presented (e.g., by selecting option 620 of FIG. 6).

A preview pane (e.g., preview pane 806) may be provided for previewing the media content currently being accessed by a restricted user. In the illustrated embodiment, a different preview pane is provided for each restricted user. The preview panes may display preview elements (e.g., thumbnails or reduced size video) representative of the media content associated with the real-time entries. For example, preview element 808 within preview pane 806 represents the media content associated with entry 804, which is currently being accessed by the restricted user corresponding to username 802. Preview elements may display or give access to representative samples of the media content, or they may display or give access to the real-time media content itself. In some embodiments, preview elements may display a thumbnail related to the media content (e.g., a snapshot of the media content, cover art, etc.) and may display or give access to the media content, or a sample of the media content, when selected.

The preview panes may be scrollable to reveal additional preview elements when all preview elements are not viewable simultaneously. For example, navigation tools 810 may be provided to the user for scrolling within the preview pane. The user may be allowed to delete, modify, and reorder the real-time entries. A filter may be applied to the real-time entries, using filter controls (not shown), as described above in connection with the log entries of FIGS. 6 and 7.

A user may also select (e.g., highlight, click, touch, verbally identify, or otherwise indicate) a real-time entry to retrieve additional information related to the selected entry and/or to perform a function with regard to the selected entry. Referring again to FIG. 8, display screen 800 shows real-time entry 812 selected, as indicated by the shading applied to the entry. When a real-time entry is selected, the corresponding preview element may also appear selected and vice-versa. For example, preview element 814 may be displayed with a thick border when corresponding real-time entry 812 is selected. In some embodiments, the preview pane displays only a preview element associated with a selected real-time entry (in which case the preview element may be sized up to the dimensions of the preview pane).

Preview element 816 is an example of a thumbnail representative of internet content (e.g., a website). When selected, element 816 may be enlarged or the internet content itself may be displayed, e.g., within the preview pane or in an overlay. Preview element 818 represents a song and may contain selectable controls for controlling playback of the song. Alternatively, the playback controls may allow the user to monitor the song in real-time, as it is being played by the restricted user.

In other embodiments, only one preview pane may be provided within display screen 800. As such, the preview pane may display only a preview element associated with a elected entry. The size of the preview pane may be user-adjustable, and/or may be automatically resized as needed to display its contents.

In some embodiments, when a real-time entry is selected, parental control settings for the associated media content may be displayed. The parental control settings may be displayed in settings region 820, and may initially reflect the last known configuration of parental control settings for the media content. For example, the parental control settings may be retrieved from data store 516 of FIG. 5. Settings region 820 may display any specific information associated with the parental control settings, such as the user and/or device (or users and/or devices) to which the settings are associated.

The parental control settings may include any of the settings and options described above in reference to FIG. 7. The parental control settings may be modified and applied to the media content, in which case current and future access to the media content is subject to the modified settings. For example, the new settings may be stored in data store 516 of FIG. 5. When the access restrictions for media content currently being accessed are modified, the restrictions may take effect immediately (e.g., a restricted user may be blocked from accessing particular media content as soon as the modified settings are stored).

Figure 9:
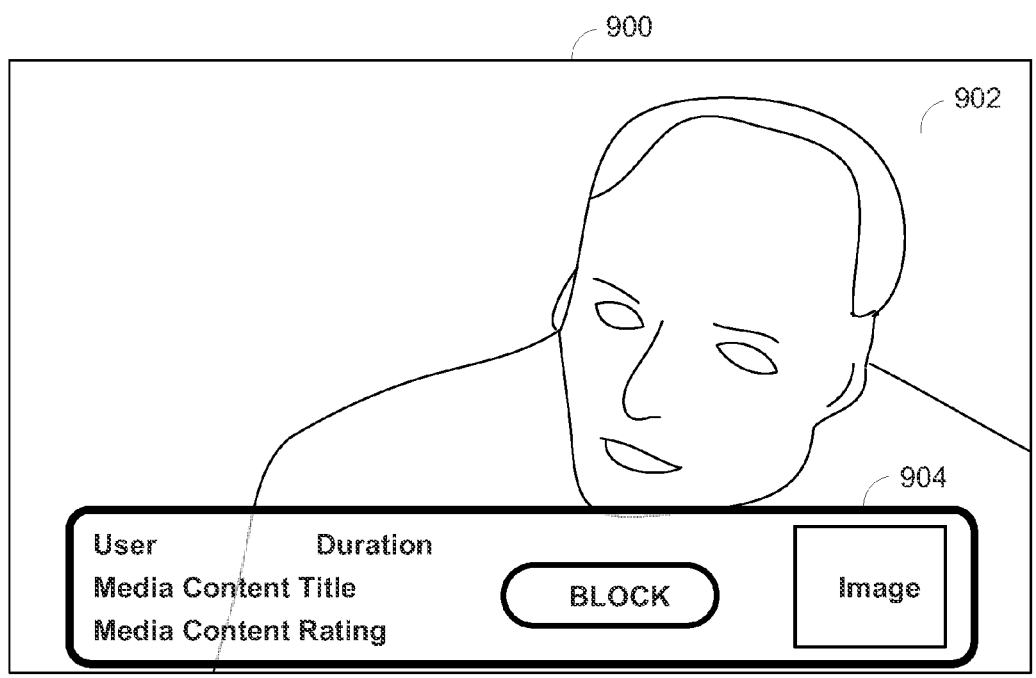
FIG. 9 illustrates an example of an overlay for presenting information on real-time media content being accessed by users in accordance with some embodiments of the present invention.

Referring now to FIG. 9, a display screen 900 is depicted that includes an overlay 904 for presenting information on real-time media content being accessed by restricted users, in accordance with some embodiments. Overlay 904 is displayed over media content 902, which may be, for example, a television program. Overlay 904 may be displayed in response to a user indication, or it may be displayed automatically upon receipt of a media content access request from a restricted user. Information related to the real-time media content being accessed by a restricted user may be provided within the overlay. For example, the overlay may indicate the restricted user accessing the media content, the title and rating of the media content, any access restrictions applied to the media content, etc. The overlay may also include an icon or other visual representation of the real-time media content, or the actual media content itself. In addition, the overlay may provide parental control options to the user. The parental control options may allow the user to configure access restrictions (e.g., block) for the restricted user accessing the media content. The user may also be provided with options to apply the parental control settings to other "related" content, other users, other media types, and/or other devices, as discussed in detail above.

Figure 10:
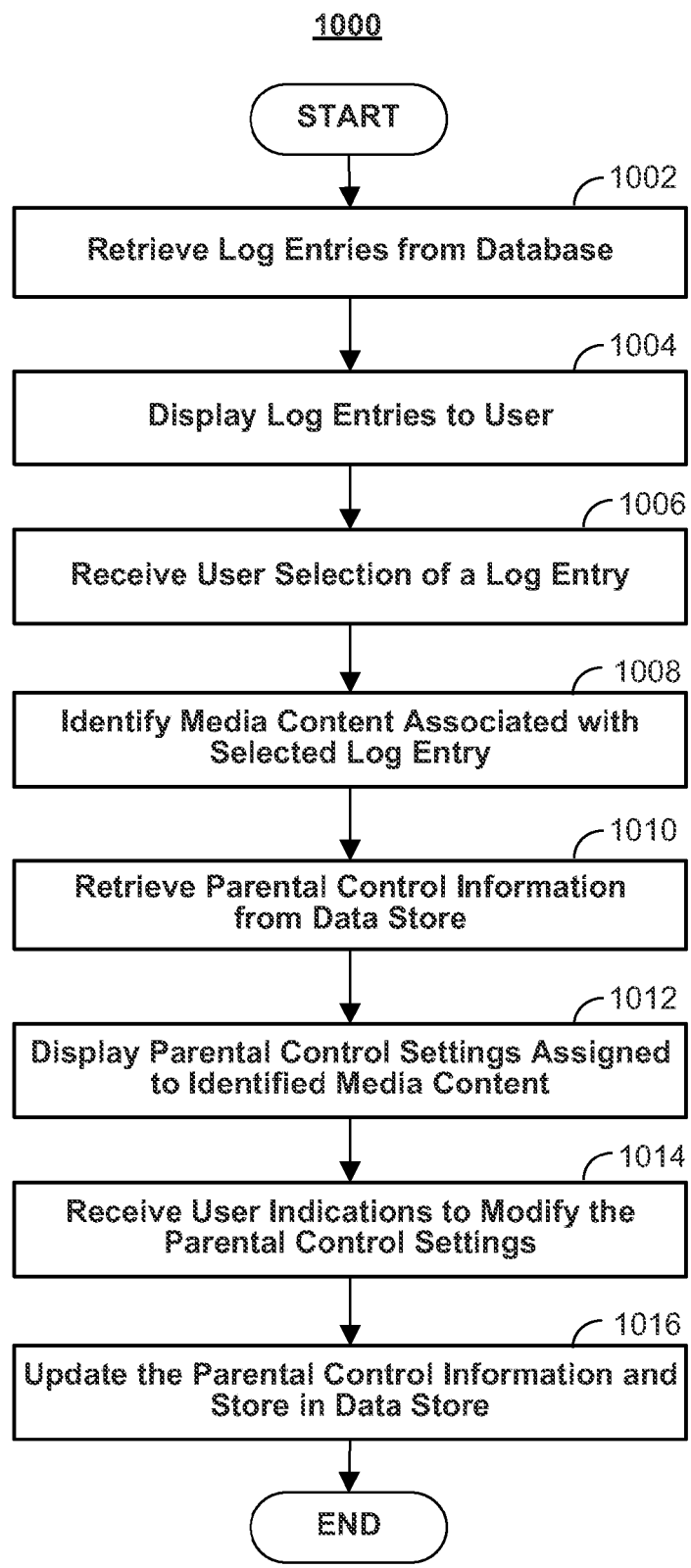
FIG. 10 illustrates an example of a process for modifying parental control settings based on recorded log entries in accordance with some embodiments of the present invention.

FIG. 10 illustrates a process 1000 for modifying parental control settings based on recorded log entries in accordance with some embodiments. Process 1000 may be part of the functionality of parental review module 522 of FIG. 5. As shown, beginning at step 1002, process 1000 may access a data store (e.g., log database 524 of FIG. 5) to retrieve log entries associated with media content accessed by restricted users. The log entries may include or link to information identifying the media content and/or the associated media content access request.

At step 1004, the log entries may be displayed to the user. For example, the log entries may be displayed in a selectable list (e.g., list 708 of FIG. 7). The displayed log entries may present any suitable information to the user, including the media type, title, and rating of the media content. The log entries may also present the duration of restricted user access to the media content, the username of the restricted user, and indications of the access restrictions applied to the media content.

At step 1006, a user selection of a displayed log entry is received. In turn, at step 1008, the media content associated with the selected log entry is identified. Media content identification may be performed using any of the information stored with the selected log entry. At step 1010, parental control information is retrieved from a parental control data store (e.g., data store 516 of FIG. 5). The retrieved parental control information may define general parental control settings and/or parental control settings particular to the identified media content. The applicable parental control settings (i.e., the parental control settings assigned to the identified media content) may be derived from the retrieved information and displayed, at step 1012, to the user.

The user may review the parental control settings in a user interface that provides parental control tools for modifying those settings. At step 1014, user indications to modify the parental control settings assigned to the identified media content are received. The settings may restrict the media content by blocking, filtering, or flagging the media content, or by setting an alert. A user indication may be received to apply or save the modified parental control settings and, at step 1016, the retrieved parental control information may be updated to incorporate the modified settings. The updated parental control information may be stored (e.g., in data store 516 of FIG. 5) and/or distributed to devices that utilize the parental control information to restrict access to media.

In one illustrative example, a log entry for a television program is retrieved and displayed to a user at steps 1002 and 1004. The log entry may indicate that the program accessed was "24" and is associated with a "TV14" rating. The log entry may also indicate that restricted user "David" accessed the show for 29 minutes, and that the program was flagged and an alert sent when the program was accessed. A user selection of the log entry is received at step 1006 and, at step 1008, the media content associated with that log entry, i.e. "24", is identified. Parental control information is retrieved at step 1010, and the parental controls settings assigned to "24" (e.g., for user "David") are derived from the retrieved information. At step 1012, the parental control settings assigned to "24", for user "David", are displayed to the user for review and modification. User indications to modify the parental control settings are received at step 1014 and stored at step 1016. For example, a user indication to block access to "24" for user "David" may be received and incorporated within updated parental control information. Subsequent accesses to "24" by user "David" would then be disallowed. In some embodiments, user indications to apply the modified parental control settings to other media types, users, and/or devices may also be received and the parental control information updated (and stored) accordingly.

Figure 11:
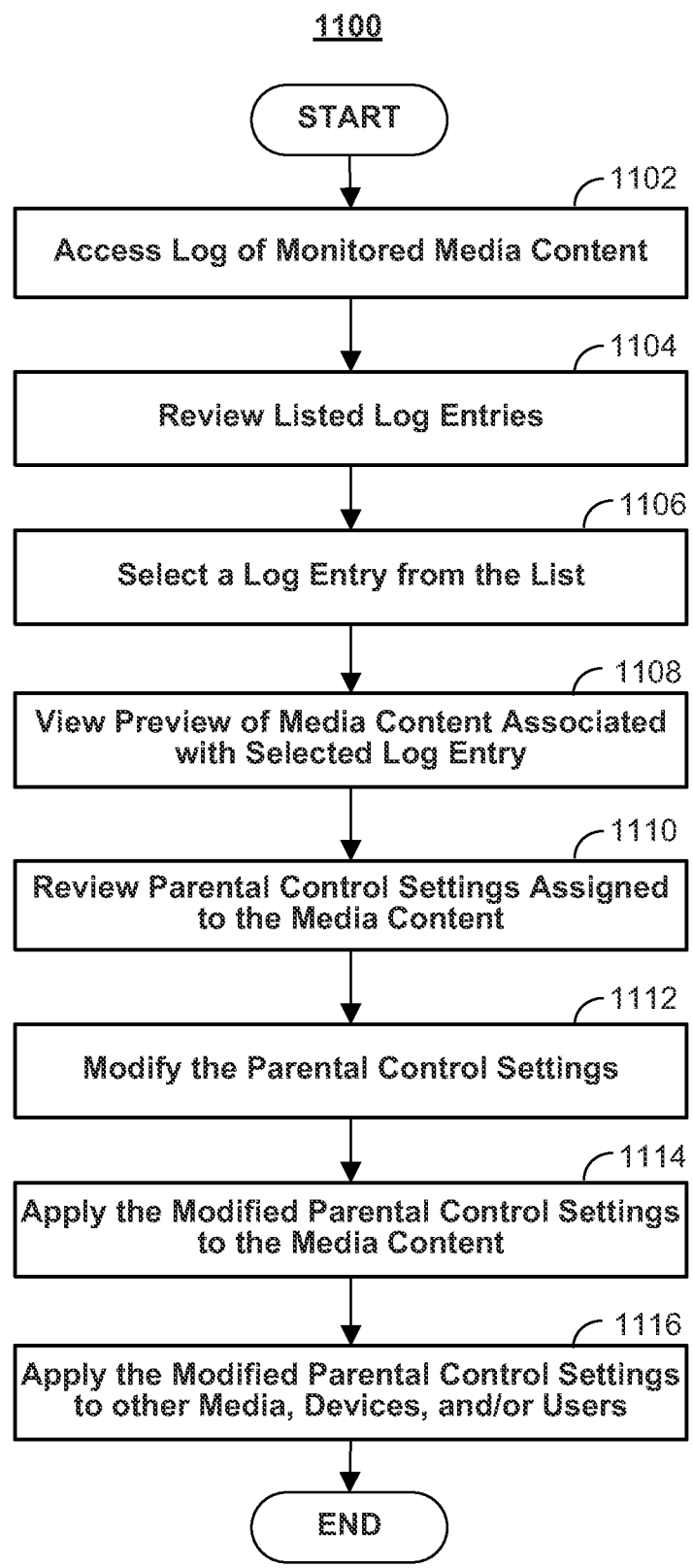
FIG. 11 shows an illustrative flow diagram for updating parental control settings based on user indications in accordance with some embodiments of the present invention.

FIG. 11 shows an illustrative flow diagram for updating parental control settings based on user indications, in accordance with some embodiments of the invention. Beginning with step 1102, a user may access a log of monitored media content (e.g., display screen 700 of FIG. 7 via option 606 of FIG. 6, using parental review application 522 of FIG. 5). At step 1104, the user may review a list of log entries (e.g., list 708 of FIG. 7), each corresponding to media content (i.e., a particular media asset) and generated as a result of a media content access request (e.g., request 503 of FIG. 5). As used herein, "media asset" refers to a particular media content, such as a television program, movie, trailer, commercial, advertisement, program listing, interactive game, Internet website, mobile application, song, podcast, streaming radio, e-book, etc. The log entries may display any suitable information related to the media content and/or the triggering media content access request, including the access restrictions applied to the media content. For example, a log entry may display any information stored in log data store 524 of FIG. 5 when the log entry was generated.

At step 1106, the user selects one of the displayed log entries with a user input device and, at step 1108, may view a preview of the associated media content (e.g., in preview pane 734 of FIG. 7). The preview may include a preview element representative of the media content, or the media content itself. At step 1110, the user may view parental control settings assigned to the media content (e.g., in settings region 736 of FIG. 7). The settings may be derived (e.g., by log module 520) from parental control information stored in a data store (e.g., database 516 of FIG. 5). In some embodiments, the settings are particular to the restricted user and/or device that accessed the media content.

At step 1112, the user may modify the parental control settings. Parental control tools (e.g., as provided in settings pane 736 of FIG. 7) may be provided to allow the user to modify the settings. In particular, the tools may allow the user to impose or remove access restrictions such as blocking or filtering the media content, flagging the media content, and/or triggering an alert upon reception of a media content access request for the media content. The parental control tools may also allow the user to indicate that the modified settings should be applied only to the restricted user who accessed the media content, or to other users as well. The tools may also allow the user to specify that that the modified settings should be applied to media related to the media content and/or to media types other than the media type of the media content. Finally, the tools may allow the user to indicate particular devices that should be subject to the updated settings. The parental control tools may be implemented within parental control review application 522 itself or may be provided by parental control tools 518 via application 522 FIG. 5.

At step 1114 the modified parental control settings are applied to the media content (e.g., based on a user indication). When applicable (e.g., based on the user indications at step 1112), the modified parental control settings are also applied to other media, devices, and/or users at step 1116. Future media content access requests for media assigned the updated parental control settings may accordingly be subject to new access restrictions. It should be understood that applying parental control settings to media content may include storing those settings in a parental control data store (e.g., data store 516 of FIG. 5). Parental control settings may be stored by updating parental control information within the data store, which may be associated with the media content (and/or related media content), a particular restricted user (and/or other designated users), and/or a particular user equipment device (and/or other designated devices).

Figure 12:
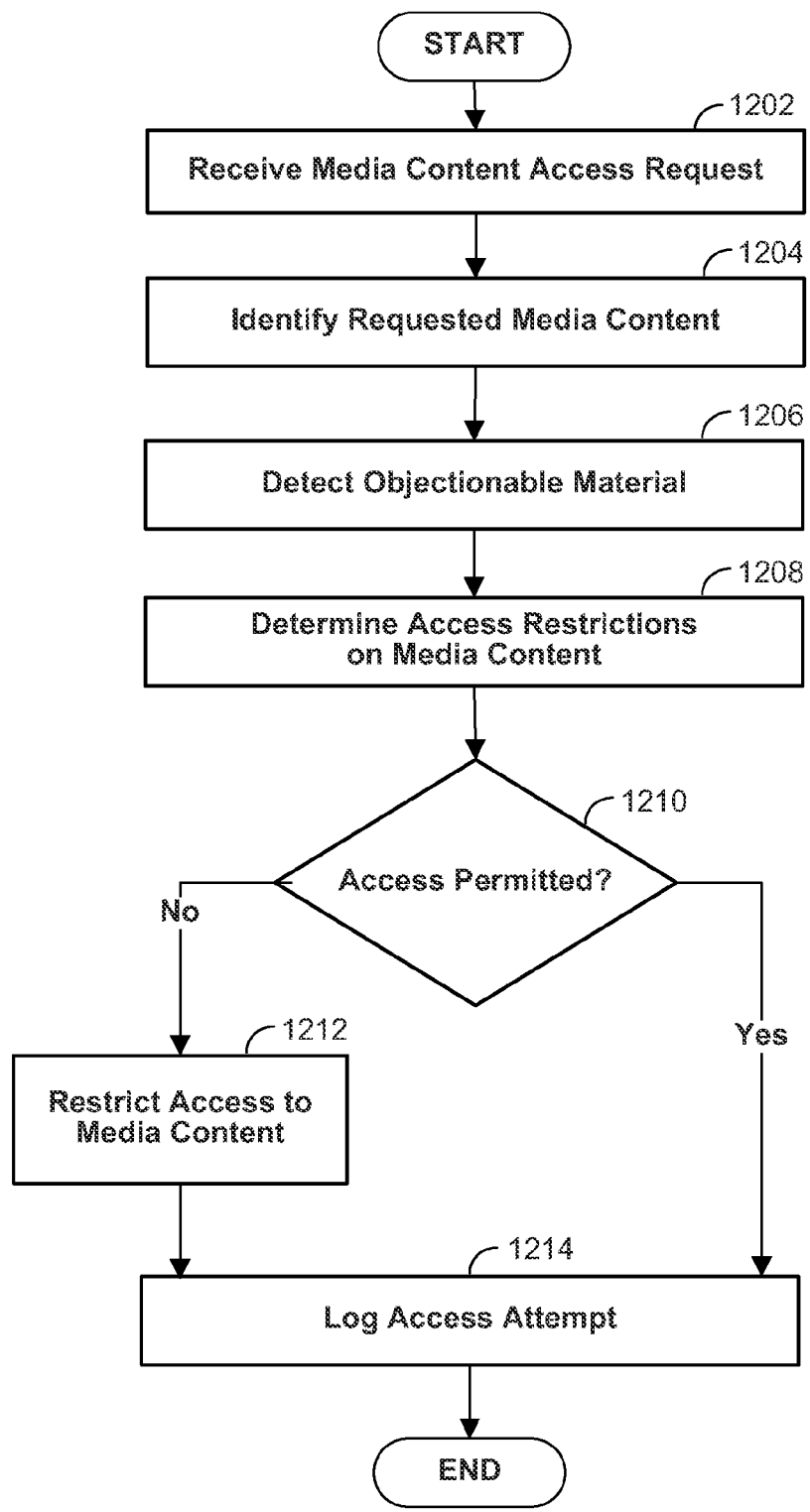
FIG. 12 illustrates an example of a process for restricting media content based on parental control settings in accordance with some embodiments of the present invention.

FIG. 12 illustrates a process 1200 for restricting media content based on parental control settings. Process 1200 may be part of the functionality of access control module 510 of FIG. 5. As shown, beginning at step 1202, process 1200 may receive a media content access request (e.g., media content access request 503 of FIG. 5) that defines a request by a restricted user to access particular media content (i.e., a media asset). At step 1204, the requested media content (e.g., media content 502 of FIG. 5) is identified. In some embodiments, process 1200 continues to step 1208 (skipping step 1206), where access restrictions on the media content are determined based on parental control information (e.g., retrieved from a parental control data store). In other embodiments, process 1200 proceeds from step 1204 to step 1206, where objectionable material within the media content is identified. Media detection unit 512 of FIG. 5 may be used to detect objectionable material. Then, at step 1208, process 1200 may determine whether any access restrictions are applicable to the media content based on the parental control information and/or detected objectionable material.

At step 1210, it is determined whether access to the media is permitted based on the determined access restrictions. If so, process 1200 may proceed to step 1214 where the access attempt is logged (e.g., stored in log database 524 of FIG. 5). Otherwise, process 1200 may continue to step 1212, where the media content is restricted. Restricting access to the media content may include blocking the media content, filtering the media content (i.e., remove or replace part of the content), flagging the media content, and generating an alert. Finally, at step 1214, the access attempt is logged, including any suitable information related to the access attempt. In particular, the log entry may store any information related to the media content access attempt, the media content, any applied access restrictions, and/or the requesting user or device.

Thus, it is seen that methods and devices for recommending parental controls in an interactive media guidance application are provided. One skilled in the art will appreciate that the invention can be practiced by other than the described embodiments, which are presented for purposes of illustration and not of limitation, that various features of the described embodiments can be interchanged and used in any suitable combination, and that the present invention is limited only by the claims which follow.

What is claimed is:

1. A method for accessing parental control features, comprising:
retrieving a plurality of log entries for a device associated with a plurality of media assets from a log data store, wherein a first log entry of the plurality of log entries defines an unsuccessful attempt to access a first media asset of the plurality of media assets and includes information identifying the first media asset, and a second log entry of the plurality of log entries defines a completed successful attempt to access a second media asset of the plurality of media assets and includes information identifying the second media asset;
generating for display a user interface that presents the plurality of log entries for the device to a user;
receiving a first user selection of a first selectable option corresponding to the second log entry of the plurality of log entries to access parental control settings of the second media asset corresponding to the second log entry of the plurality of log entries;
determining parental control settings assigned to the second media asset based on receiving the first user selection;
generating for display a second selectable option to modify the parental control settings;
receiving a second user selection of the second selectable option; and
applying the parental control settings as modified based on the second user selection, wherein the applying comprises storing the modified parental control settings in a parental control data store and wherein the modified parental control settings restrict access to the second media asset corresponding to the second log entry in the future.

2. The method of claim 1, wherein each of the plurality of media assets has one of a plurality of different media types, wherein the plurality of different media types comprises a television program, a program listing, internet content, video content, audio content, an interactive game, a mobile application, and an advertisement.

3. The method of claim 1 further comprising:
identifying, other media assets related to the second media asset corresponding to the second log entry based on receiving a third user selection; and
applying the modified parental control settings to the other media assets.

4. The method of claim 3, wherein identifying other media assets related to the second media asset corresponding to the second log entry comprises identifying only other media assets that have a same media type as the second media asset corresponding to the second log entry.

5. The method of claim 1, wherein:
the parental control data store comprises parental control information associated with a plurality of restricted users;
each of the plurality of log entries further includes information identifying one of the plurality of restricted users associated with an attempt to access a media asset of the plurality of media assets;
the parental control settings are determined from the parental control information associated with the restricted user identified in the second log entry; and
applying the modified parental control settings comprises updating the parental control information associated with the restricted user identified in the second log entry to incorporate the modified parental control settings.

6. The method of claim 5 further comprising:
identifying, in response to a third user selection, one or more of the plurality of restricted users other than the restricted user identified in the second log entry; and
updating the parental control information associated with the one or more restricted users in the parental control data store to incorporate the modified parental control settings.

7. The method of claim 1, further comprising allowing the user to monitor activities of one or more restricted users in real time.

8. The method of claim 7, wherein allowing the user to monitor the activities of the one or more restricted users in real time comprises generating a display of a video stream of media assets currently accessed by the one or more restricted users.

9. The method of claim 7, wherein allowing the user to monitor the activities of the one or more restricted users in real time comprises providing an alert each time the one or more restricted users attempts to access a restricted media asset.

10. The method of claim 1, wherein the first log entry of the plurality of log entries further includes information identifying access restrictions imposed during the unsuccessful attempt to access the first media asset, and wherein the user interface further presents the imposed access restrictions together with the first log entry.

11. The method of claim 1, wherein the information identifying the first or second media asset includes at least one of a title, an artist, an album, a rating, a genre, a theme, a category, a keyword, a metadata term, a channel, an owner, a link, a unique identification code, a graphic, cover art, a trailer, an audio or video clip, and a sponsor.

12. The method of claim 1, wherein the parental control settings include at least one of a setting to block the second media asset, a setting to permit the second media asset, a setting to filter the second media asset, a setting to flag the second media asset, a setting to provide an alert when an attempt is made to access the second media asset, and a setting to require approval to access the second media asset.

13. A parental control system comprising:
a log data store that includes a plurality of log entries for a device associated with a plurality of media assets, wherein a first log entry of the plurality of log entries defines an unsuccessful attempt to access a first media asset of the plurality of media assets and includes information identifying the first media asset, and a second log entry of the plurality of log entries defines a completed successful attempt to access a second media asset of the plurality of media assets and includes information identifying the second media asset;
a parental control data store that includes parental control information, wherein the parental control information restricts access to the plurality of media assets; and
processing circuitry configured to:
generate for display a user interface that presents the plurality of log entries for the device to a user, wherein the log entries are retrieved from the log data store;
receive a first user selection of a first selectable option corresponding to the second log entry of the plurality of log entries to access parental control settings of the second media asset corresponding to the second log entry of the plurality of log entries;
determine parental control settings assigned to the second media asset based on receiving the first user selection, wherein the parental control settings are received from the parental control data store;
generating for display a second selectable option to modify the parental control settings;
receiving a second user selection of the second selectable option;
and
apply the parental control settings as modified based on the second user selection, wherein applying the modified parental control settings comprises storing the modified parental control settings in the parental control data store and wherein the modified parental control settings restrict access to the second media asset corresponding to the second log entry in the future.

14. The parental control system of claim 13, wherein each of the plurality of media assets has one of a plurality of different media types, wherein the plurality of different media types comprises a television program, a program listing, internet content, video content, audio content, an interactive game, a mobile application, and an advertisement.

15. The parental control system of claim 14, wherein the processing circuitry is further configured to:
identify other media assets related to the second media asset corresponding to the second log entry based on receiving a third user selection; and
apply the modified parental control settings to the other media assets.

16. The parental control system of claim 15, wherein the processing circuitry identifies only other media assets that have a same media type as the second media asset corresponding to the second log entry.

17. The parental control system of claim 13, wherein:
the parental control information comprises parental control information associated with a plurality of restricted users;
each of the plurality of log entries further includes information identifying one of the plurality of restricted users associated with an attempt to access a media asset of the plurality of media assets;
the processing circuitry determines the parental control settings from the parental control information associated with the restricted user identified in the second log entry; and
the processing circuitry applies the modified parental control settings by updating the parental control information associated with the restricted user identified in the second log entry to incorporate the modified parental control settings.

18. The parental control system of claim 17, wherein the processing circuitry is further configured to:
identify, in response to a third user selection, one or more of the plurality of restricted users other than the restricted user identified in the second log entry; and
update the parental control information associated with the one or more restricted users in the parental control data store to incorporate the modified parental control settings.

19. The parental control system of claim 13, wherein the processing circuitry is further configured to allow the user to monitor activities of one or more restricted users in real time.

20. The parental control system of claim 19, wherein the processing circuitry allows the user to monitor the activities of the one or more restricted users in real time by generating a display of a video stream of media assets currently accessed by the one or more restricted users.

21. The parental control system of claim 19, wherein the processing circuitry allows the user to monitor the activities of the one or more restricted users in real time by providing an alert each time the one or more restricted users attempts to access a restricted media asset.

22. The parental control system of claim 13, wherein the first log entry of the plurality of log entries further includes information identifying access restrictions imposed during the unsuccessful attempt to access the first media asset, and wherein the user interface further presents the imposed access restrictions together with the first log entry.

23. The parental control system of claim 13, wherein the information identifying the first or second media asset includes at least one of a title, an artist, an album, a rating, a genre, a theme, a category, a keyword, a metadata term, a channel, an owner, a link, a unique identification code, a graphic, cover art, a trailer, an audio or video clip, and a sponsor.

24. The parental control system of claim 13, wherein the parental control settings include at least one of a setting to block the second media asset, a setting to permit the second media asset, a setting to filter the second media asset, a setting to flag the second media asset, a setting to provide an alert when an attempt is made to access the second media asset, and a setting to require approval to access the second media asset.

* * * * *